(12) United States Patent
Arsenault et al.

(10) Patent No.: US 7,646,792 B2
(45) Date of Patent: *Jan. 12, 2010

(54) DYNAMIC MAPPING OF BROADCAST RESOURCES

(75) Inventors: Robert G. Arsenault, Redondo Beach, CA (US); Tam T. Leminh, Cypress, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/298,435

(22) Filed: Dec. 9, 2005

(65) Prior Publication Data

US 2006/0088062 A1 Apr. 27, 2006

Related U.S. Application Data

(63) Continuation of application No. 10/288,996, filed on Nov. 5, 2002, now Pat. No. 7,075,945, which is a continuation of application No. 09/893,094, filed on Jun. 26, 2001, now Pat. No. 6,501,770, which is a continuation of application No. 09/199,702, filed on Nov. 25, 1998, now Pat. No. 6,278,717, which is a continuation of application No. 08/708,524, filed on Sep. 5, 1996, now Pat. No. 5,886,995.

(51) Int. Cl.
*H04J 3/18* (2006.01)
*H04N 11/02* (2006.01)
*H04H 20/06* (2008.01)

(52) U.S. Cl. ............... 370/477; 348/385.1; 375/240.01

(58) Field of Classification Search ............... 370/312, 370/342, 477; 348/326, 388.1, 386.1, 387.1; 375/240.01, 260, 299; 725/32, 39, 48, 95–97
See application file for complete search history.

(56) References Cited

U.S. PATENT DOCUMENTS 4,525,867 A * 6/1985 Shiratani ............... 455/194.1
(Continued)

FOREIGN PATENT DOCUMENTS

| EP | 0508654 | 10/1992 |
|---|---|---|
| JP | 3-270488 | 12/1991 |
| JP | 7-111648 | 4/1995 |
| WO | WO 94/19881 | 9/1994 |
| WO | WO 96/13124 | 5/1996 |
| WO | WO 97/16020 | 5/1997 |

OTHER PUBLICATIONS

"Program Guide for Digital Television: ATSC Standard"; Advanced Television Systems Committee; Jan. 3, 1996; Doc. A/55; pp. i-48.
"Digital Broadcasting Systems for Television, Sound and Data Services—Specification for Service Information (SI) in Digital Video Broadcasting (DVB) Systems"; European Telecommunications Standards Institute; Draft, pr ETS 300 468; Oct. 1994; pp. 1-51.
(Continued)

*Primary Examiner*—Chi H Pham
*Assistant Examiner*—Ahmed Elallam

(57) ABSTRACT

In a data communication system such as a high capacity DBS system, dynamic mapping of broadcast resources is provided to exploit occasional redundancy in the program content of two or more input data streams, freeing at least one broadcast resource to carry alternate bitstreams, such as additional programs or existing programs at higher quality. Transmission maps defining the correspondence between input data streams and broadcast resources, and reception maps defining the correspondence between broadcast resources and output data streams, are updated as needed to dynamically modify broadcast resource mapping to increase effective utilization of available bandwidth. Beneficial n:n-y:m mapping in a high capacity consumer DBS entertainment system is provided. Apparatus and methods for efficiently generating, maintaining and updating allocation maps with reduced overhead requirements, are disclosed.

10 Claims, 7 Drawing Sheets

U.S. PATENT DOCUMENTS

| | | | | |
|---|---|---|---|---|
| 4,541,008 A | | 9/1985 | Fishman et al. | |
| 4,581,737 A | | 4/1986 | Sparrell | |
| 5,121,430 A | | 6/1992 | Ganzer et al. | |
| 5,155,591 A | | 10/1992 | Wachob | |
| 5,200,823 A | | 4/1993 | Yoneda et al. | |
| 5,276,679 A | | 1/1994 | McKay et al. | |
| 5,296,931 A | * | 3/1994 | Na | 725/38 |
| 5,319,707 A | * | 6/1994 | Wasilewski et al. | 380/212 |
| 5,371,547 A | | 12/1994 | Siracusa et al. | |
| 5,381,412 A | | 1/1995 | Otani | |
| 5,392,284 A | | 2/1995 | Sugiyama | |
| 5,412,416 A | | 5/1995 | Nemirofsky | |
| 5,418,782 A | | 5/1995 | Wasilewski | |
| 5,420,866 A | | 5/1995 | Wasilewski | |
| 5,432,542 A | | 7/1995 | Thibadeau et al. | |
| 5,446,490 A | * | 8/1995 | Blahut et al. | 725/97 |
| 5,446,919 A | | 8/1995 | Wilkins | |
| 5,499,046 A | | 3/1996 | Schiller et al. | |
| 5,534,941 A | * | 7/1996 | Sie et al. | 348/564 |
| 5,539,635 A | * | 7/1996 | Larson, Jr. | 700/234 |
| 5,550,576 A | * | 8/1996 | Klosterman | 725/46 |
| 5,559,548 A | * | 9/1996 | Davis et al. | 725/40 |
| 5,563,883 A | | 10/1996 | Cheng | |
| 5,563,892 A | | 10/1996 | Kostreski et al. | |
| 5,565,909 A | | 10/1996 | Thibadeau et al. | |
| 5,583,562 A | * | 12/1996 | Birch et al. | 725/151 |
| 5,600,378 A | | 2/1997 | Wasilewski | |
| 5,619,274 A | | 4/1997 | Roop et al. | |
| 5,642,153 A | | 6/1997 | Chaney et al. | |
| 5,652,615 A | | 7/1997 | Bryant et al. | |
| 5,666,645 A | * | 9/1997 | Thomas et al. | 725/47 |
| 5,697,080 A | * | 12/1997 | Kasa | 455/228 |
| 5,708,961 A | * | 1/1998 | Hylton et al. | 725/81 |
| 5,742,732 A | | 4/1998 | Kubo et al. | |
| 5,742,892 A | * | 4/1998 | Chaddha | 725/146 |
| 5,822,324 A | * | 10/1998 | Kostreski et al. | 370/487 |
| 5,886,995 A | | 3/1999 | Arsenault et al. | |
| 5,912,917 A | | 6/1999 | Engelbrecht et al. | |
| 5,995,553 A | | 11/1999 | Crandall et al. | |
| 6,003,041 A | | 12/1999 | Wugofski | |
| 6,278,717 B1 | | 8/2001 | Arsenault et al. | |
| 6,301,248 B1 | | 10/2001 | Jung et al. | |
| 6,314,577 B1 | * | 11/2001 | Pocock | 725/93 |
| 6,401,242 B1 | | 6/2002 | Eyer et al. | |
| 6,473,858 B1 | | 10/2002 | Shimomura et al. | |
| 6,477,579 B1 | | 11/2002 | Kunkel et al. | |
| 6,487,721 B1 | | 11/2002 | Safadei | |
| 6,526,576 B1 | * | 2/2003 | Kwoh | 725/39 |
| 6,546,427 B1 | | 4/2003 | Ehrlich et al. | |
| 6,577,849 B1 | | 6/2003 | Eaton et al. | |
| 6,718,551 B1 | | 4/2004 | Swix et al. | |
| 6,760,537 B2 | * | 7/2004 | Mankovitz | 386/83 |
| 2002/0092017 A1 | | 7/2002 | Klosterman et al. | |
| 2003/0145320 A1 | | 7/2003 | Vogel | |
| 2004/0128682 A1 | | 7/2004 | Liga et al. | |

OTHER PUBLICATIONS

"System Information for Digital Television"; Advanced Television Systems Committee; Jan. 3, 1996; Doc. A/56; pp. i-77.

* cited by examiner

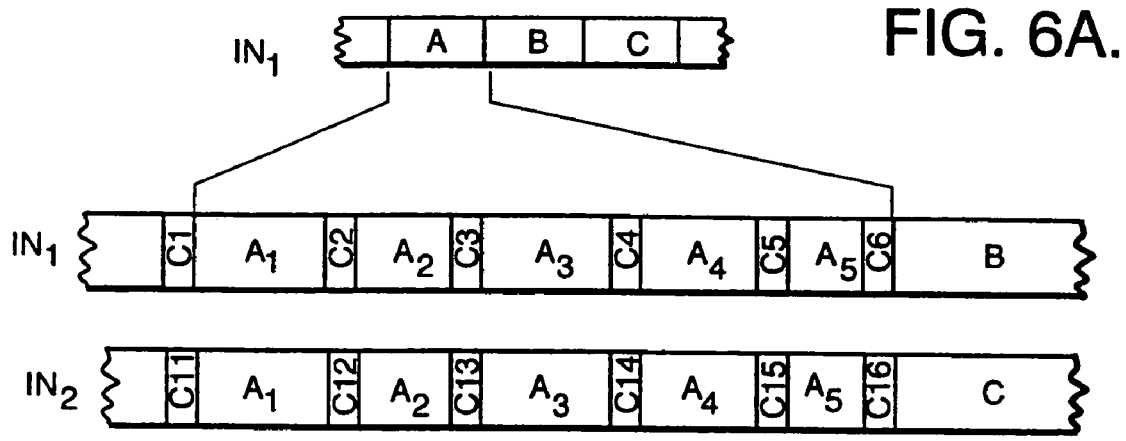
FIG. 6A.
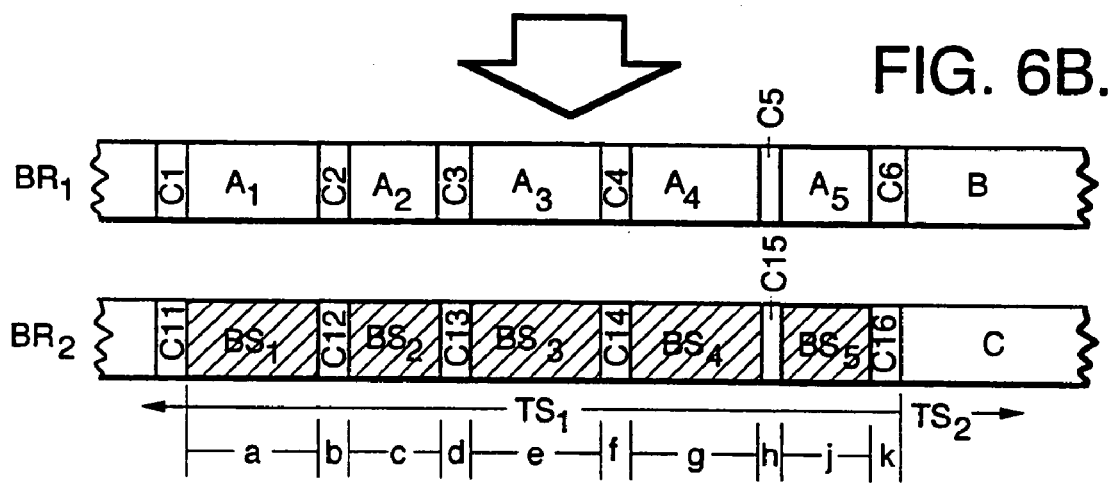
FIG. 6B.
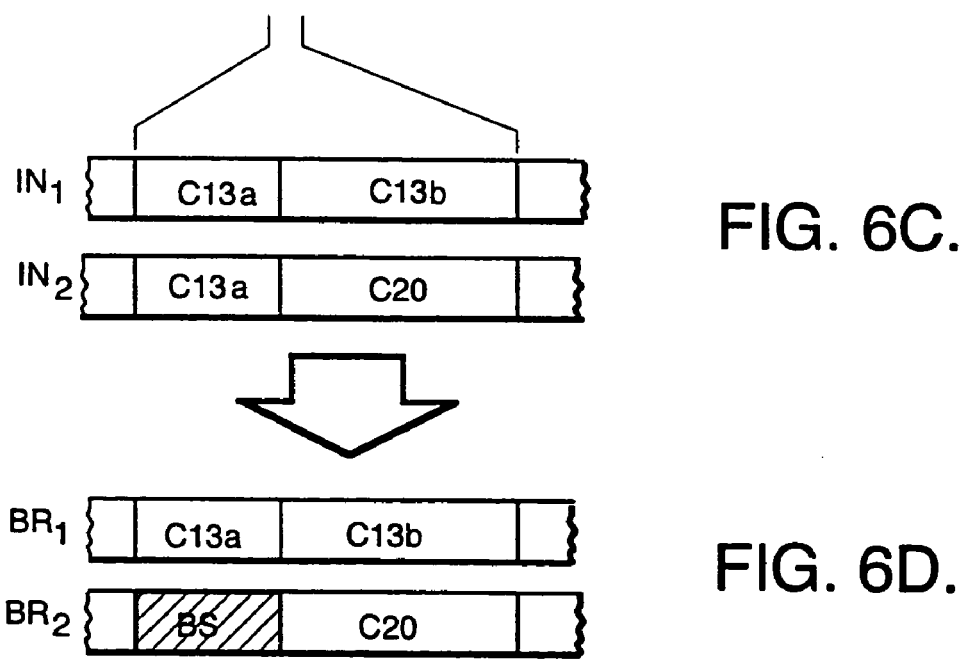
FIG. 6C.
FIG. 6D.

FIG. 8.
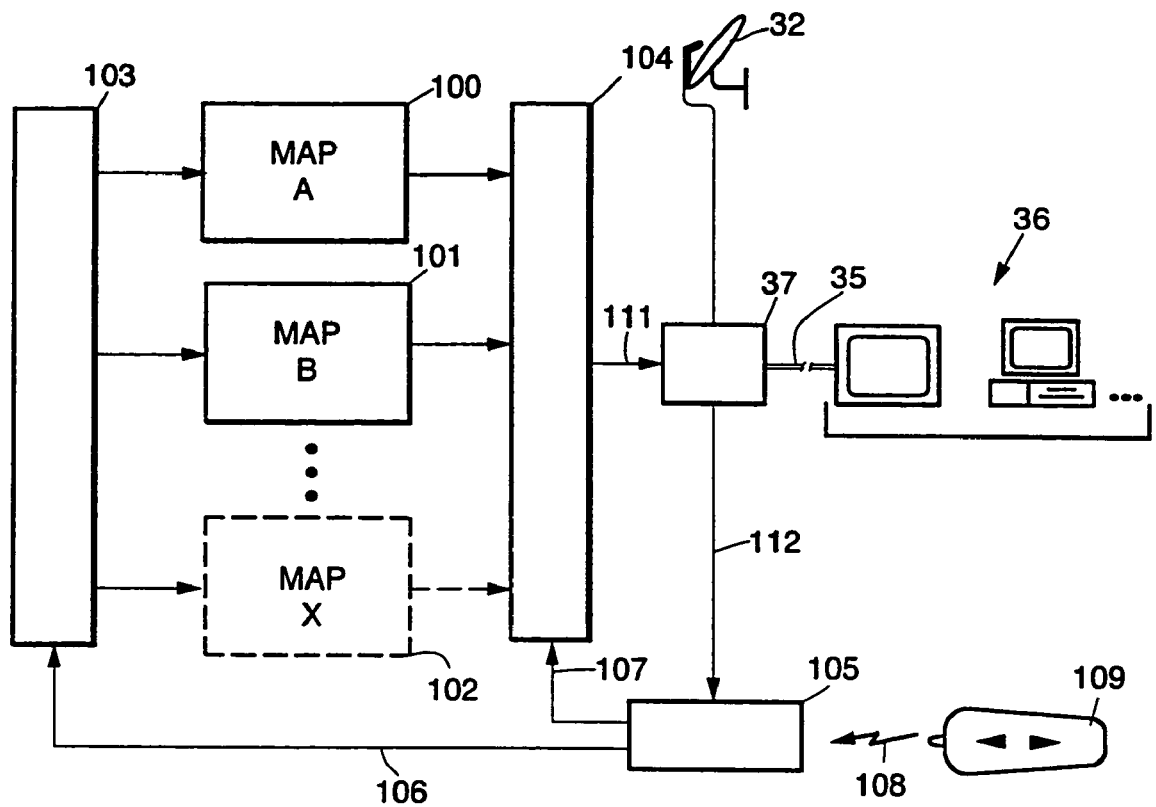
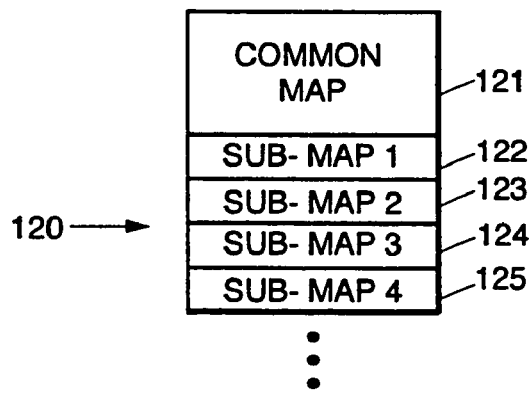
FIG. 9.

DYNAMIC MAPPING OF BROADCAST RESOURCES

This application is a Continuation of U.S. patent application Ser. No. 10/288,996, filed Nov. 5, 2002 now U.S. Pat. No 7,075,945, by Robert G. Arsenault, Tam T. Leminh, and Thomas H. James, for "DYNAMIC MAPPING OF BROADCAST RESOURCES", which is a Continuation of U.S. patent application Ser. No. 09/893,094, filed Jun. 26, 2001, by Robert G. Arsenault, Tam T. Leminh, and Thomas H. James, for "DYNAMIC MAPPING OF BROADCAST RESOURCES", now issued as U.S. Pat. No. 6,501,770, which is a Continuation of U.S. patent application Ser. No. 09/199,702, filed Nov. 25, 1998, by Robert G. Arsenault, Tam T. Leminh, and Thomas H. James, for "DYNAMIC MAPPING OF BROADCAST RESOURCES", now issued as U.S. Pat. No. 6,278,717, which is a Continuation of U.S. patent application Ser. No. 08/708,524, filed Sep. 5, 1996, by Robert G. Arsenault, Tam T. Leminh, and Thomas H. James, for "DYNAMIC MAPPING OF BROADCAST RESOURCES", now issued as U.S. Pat. No. 5,886,995.

BACKGROUND OF THE INVENTION

The present invention relates in general to the processing of high data rate information signals. In particular embodiments it relates to processing of video, audio and/or data information in a direct broadcast satellite (DBS) consumer entertainment system.

The information carrying capacity of any data network is limited by, among other things, its effective bandwidth. Limitations in available bandwidth, resulting from technical limitations of the processing and transmission elements (e.g. transmission line limitations), from government limitations (e.g. limited RF spectrum allocation), or otherwise, restrict the amount of information which can be carried by the related system. This may result in a limitation on the quantity or quality (or both) of the services which may be provided by the system, often requiring compromises or tradeoffs.

Transmission of television programming to home viewers has long been subject to the these limitations and tradeoffs. Terrestrial RF broadcasts are limited in a given locality to a few frequency bands (channels) allocated by government authority for television transmission, and selected to be non-interfering over the limited range of the transmission. The frequency band allocated to each channel was selected to accommodate the then-standard transmission scheme employed (e.g. NTSC in the United States), and to minimize or avoid out-of-band interference. Although additional frequencies (e.g. UHF in the United States) were later allocated, restrictions on available RF spectrum have long limited the number of programs which could be made available to the consumer.

Distribution of program material via cable networks provided additional bandwidth to broadcasters (i.e. cable operators), overcoming in part the restriction imposed by scarcity of available RF spectrum. However, cable systems are technically limited to the useable bandwidth of the network, including the transmission line and associated electronics.

Advances in signal processing technology have permitted more programming information, improved quality, and new services (e.g. data services) to be transmitted within a given available bandwidth. For example, digital processing of both video and audio signals, together with advances in encoding and compression techniques (e.g. MPEG and MPEG-2), have permitted a reduction in the bandwidth required for transmission of video and audio signals of acceptable quality, and/or transmission of higher quality video and audio signals. Together with advances in the associated transmission and reception equipment allowing greater utilization of available spectrum, a dramatic increase in the amount of user programming that can be transmitted over a given medium is possible. In addition, systems have been developed to utilize alternative delivery systems and other portions of the RF spectrum. For example, direct broadcast satellite (DBS) systems provide entertainment and information broadcasts directly to consumers, in some cases by means of high power satellite transponders and small (e.g. 18-inch) consumer receiving dishes. Although one such system is today capable of transmitting over 175 channels of video, audio and/or data programming at higher quality levels than previously known, there remains a desire to provide additional transmission capability and to fully utilize all available bandwidth for benefit of the consumer.

Distribution systems, whether broadcast (satellite or terrestrial), cable, optical, or otherwise, typically provide a plurality of accessible broadcast resources. In an early model, a terrestrial television broadcast system included a number of individual channels or frequency bands, selectable by the consumer. Taking the television system as a whole, each channel available in a given locality provided a broadcast resource accessible by the users in that region and capable of carrying a single video/audio program. Similar frequency division multiplexing on known analog cable systems provides a generally larger number of broadcast resources in the system, again each typically carrying a single program including both video and audio, selectable as a viewer channel. In a digital DBS system, frequency and phase division multiplexing (e.g. multiple transponders operating within assigned frequencies and with LHCP and RHCP polarization) and time division multiplexing (e.g. TDM within a given frequency) may be used. In this context, each individually addressable bitstream (i.e. each selectable time slot on each selectable frequency and phase) may be considered as a separate "broadcast resource." Where different satellite locations or different delivery media are also employed in an extended system, selection of the desired satellite and transmission media, etc., is also part of identifying an individual broadcast resource.

A broadcast service will therefore have available to it a limited number of broadcast resources. If the quality of individual transmissions can be acceptably reduced, additional broadcast resources might be supported within a given RF spectrum allocation. However, the number of broadcast resources available for transmitting high quality video, audio and data programming remains limited.

A broadcaster or service provider desires to transmit to its customers (e.g. subscribers) the maximum number of programs possible utilizing the available transmission system, at the highest relative quality. As used herein, "programs" shall include video programming, audio programs, and/or data transmission of various types (e.g. software, control codes, multimedia content, digitized pictures, data, etc.). A program may include more than one form of data, such as video and one or more audio, and in some embodiments, associated data. Each of these data streams may, in preferred embodiments, be transmitted over separate broadcast resources.

A large number of content providers exist today and make available to broadcasters one or more content streams comprising programs and related content (e.g. program IDs, commercials, etc.). Many of these streams are continuous or substantially continuous, and are distributed by the content provider through various distribution media (e.g. satellite, cable, or prerecorded media) to, among other potential recipients, other broadcast services for retransmission to their viewers. For example, numerous regional sports networks exist which assemble program streams containing sporting events, often with sports-related "filler" in the times between individual sporting events.

Although content providers often generate original programs (e.g. by covering a live sporting event), it is common in the industry for one content provider to purchase programs or filler from another content provider. For example, a sports network might purchase retransmission rights to a sporting event being covered by another service provider. In these cases, the purchasing provider receives a program feed from the distribution medium (e.g. satellite) utilized by the originating provider, then retransmits this signal to its customers (e.g. cable system operators for further retransmission to consumers, or directly to consumers). The purchasing provider may insert its own commercials or identity, or may elect to use the purchased feed in its "raw" form. Often several service providers will purchase and carry the same programming originated by another provider.

A multi-channel broadcast system will typically purchase a number of input program streams from a number of content providers, for retransmission to viewers or subscribers of that system. In a digital transmission system, each individual program stream can be viewed as a continuous input data stream, where the data represents video, audio, or other (e.g. multimedia or data) information, and will be referred to herein as an "input data stream." A given program may comprise one or more than one input data streams (e.g. one or more video inputs, one or more associated audio inputs, and associated data relating to the program content). Transmitting a given number of input data streams to a number of viewers, such that each data stream is potentially available to users at all times, has typically required at least an equal number of broadcast resources.

In particular, at the transmission end each input data stream is typically assigned to an available broadcast resource. Each input data stream is therefore allocated or "mapped" to a unique broadcast resource. The correspondence matrix identifying the input stream-to-broadcast resource relationships may be considered as a "map". Because the map used at the transmission end is remote from the user (e.g. subscriber), it will be referred to herein as a "remote" map.

At the receiving end, a similar map has been used to allocate the data streams received from the broadcast resources to unique, selectable outputs. Each individual output bitstream, corresponding to a particular broadcast resource bitstream, may be referred to as an "output data stream." When a user selects a particular channel (e.g. channel 101) they expect to receive a particular program at a particular time. The receiving device accomplishes this by maintaining a complimentary receiver or "local" map which specifies the correspondence between broadcast resources and selectable outputs. In some instances, where the desired output consists of information carried over just one broadcast resource, the local map will specify correspondence between that broadcast resource and the selected output, which will consist of a single output data stream. For example, if the video and audio components of a program are encoded into a single input data stream, then selection of a program or viewer channel requires mapping of only one data stream, with the components being separated by other processors. In other instances (e.g. a movie having one or more video options, a plurality of selectable high quality audio, and/or optional related data), selection of a desired output may require mapping multiple output data streams to the corresponding broadcast resources. In these instances, the user selects a desired "viewer channel" (e.g. channel 101) and makes any optional selections (e.g. alternate audio), and the local map identifies the necessary output data streams and maps them to appropriate broadcast resources. These output data streams may be directed to an appropriate processing or performance device, such as (without limitation) a television display, audio processor, or computer. Where options are available (e.g. alternate audio), the selected option may be mapped to an output corresponding to a related processor based on a user select input, or all of the options may be mapped to a processor which itself isolates the appropriate output. In specific embodiments, components of different programs (e.g. video from a first program and audio from a different source) may be locally mapped to an output viewer channel, thereby creating a hybrid derived output.

It is important that both the remote and local maps correspond at any given time, so that selection by the user of a viewer channel will map the receiving circuitry to the correct broadcast resource(s) which, in turn, are mapped to the input data stream(s) desired by the user. It is known to modify the allocation maps from time to time. This may be done, for example, when a broadcast resource becomes unavailable, or when a reallocation of bandwidth provided by individual resources is required, such as when new input data streams are added to, or old ones removed from, a system. Such map changes have been infrequent, however, typically one to three times per day.

It is also known to locally generate derivative output data streams or viewer channels which do not correspond to any single input data stream. For example, a local processor may map a particular viewer channel to a first set of one or more broadcast resources during a first time period, then map that viewer channel to a different set of broadcast resources during a subsequent time period. In this manner, a processor has been able to provide viewers with a greater number of viewer channels than the number actually broadcast.

For purposes of the ensuing description and claims, the following notation convention may be useful. The numerical correspondence between individual input data streams and individual broadcast resources (related to the remote map), and the numerical correspondence between those broadcast resources and individual output data streams (related to the local map), may be given as IN:BR:OUT, where IN equals the number of discrete input data streams, BR represents the number of discrete broadcast resources, and OUT represents the number of discrete output data streams. In the simplest 1:1:1 correspondence, n input data streams are mapped to n broadcast resources, which are in turn mapped to n output data streams, or n:n:n. As previously noted, it is also known to generate derivative channels, which may be represented as n:n:n+x correspondence or mapping, where n and x are integers greater than or equal to one. In this example, although a 1:1 correspondence exists between input data streams and broadcast resources, a 1:>1 mapping is performed by the local map, resulting in x derivative output channels.

Although revision of the maps to accommodate infrequent changes in the input data streams or active broadcast resources, and n:n:n+x mapping to locally generate derivative channels, have provided a useful degree of flexibility in the operation of existing systems (e.g. high capacity DBS), it would be useful to reduce the amount of bandwidth required to carry desired programming, thereby allowing additional services and/or higher quality services to be carried by the same broadcast resources.

Finally, it is known that certain control and configuration information must be transmitted, in addition to the desired input data streams. Using channel maps introduces difficulties in generating and maintaining an accurate local map which reflects the current utilization of broadcast resources. Changes in the utilization of resources over time require the local map to be updated, typically by transmitting or downloading a new map to a viewer's receiver such as (for a typical DBS system) an integrated receiver/decoder (IRD). For a system having a large number of channels (i.e. 175 or more), the local map may comprise a matrix of several thousand bytes of data listing the appropriate broadcast resources for each viewer channel, for one or more time periods. Such "overhead" data transmission requires bandwidth which is therefore not available for delivery of desired consumer services. In the case of infrequent map updates, this overhead has been tolerable, although not desired. If the complexity or size of the local map were increased, or if revisions to the local map were frequent, the amount of overhead bandwidth required could become unacceptably large.

Transmission of local map data also requires time, the amount of which depends on the amount of map data and the allocated effective baud rate. Other sources of delay in generating and activating an updated map may also exist. For example, an IRD ordinarily continues to use a map until it determines the complete transmission of a more recent, updated map. Typically the IRD checks for the existence of an updated map at only predetermined intervals. Thus, another source of delay is introduced in activating a new local map.

The time delays involved with transmitting updated local maps to IRDs have also made maintaining updated maps cumbersome. The transmission of updated maps has thus been typically limited to a fixed number of predetermined times during the broadcast day, e.g. two or three times per day. Changes in the utilization of broadcast resources are therefore limited by the practical ability to update the local map. Improved flexibility in updating channel maps would allow greater flexibility in maximizing the utilization of broadcast resources.

SUMMARY OF THE INVENTION

The present invention relates to a transmission distribution system which conserves transmission bandwidth by consolidating the broadcast of simultaneous common programming from a number of different program streams comprising a number of input data streams, onto a lesser number of broadcast resources by using a unique mapping scheme. Program information may include, but is not limited to, video programming, audio programming, and/or various data services.

For example, in a television system having a large number of viewer channels, a number of different input data (e.g. program) streams may include the same programming material at a given time or times. Such simultaneous common programming typically occurs during sporting events or other live telecasts (e.g. special news events). The present invention allows all or a portion of such simultaneous programming to be broadcast over a lesser number of allocated broadcast resources, preferably a single broadcast resource for each program or program component (e.g. video, audio1, audio2, etc.), and locally mapped to the appropriate multiple viewer channels. In this manner, output data streams can be generated locally which are identical or sufficiently identical in relevant content to the numerous input data streams, although a reduced number of broadcast resources are utilized. The difference between the number of broadcast resources previously required to transmit each input data stream separately (n), and the lesser number required by the present invention (n-y), represents newly-available broadcast resources (y) which may be used for beneficial purposes.

Use of such n:n-y:m mapping, where $n \geq 2$, $n \geq y \geq 1$, and $m \geq n$, frees y broadcast resources during the periods of n:n-y remote mapping. These broadcast resources and bitstreams are thus available for transmission of alternate data (e.g. additional program information or data services) or higher-quality transmission of existing services (e.g. HDTV or AC3 audio).

In a preferred embodiment, the bitstreams thus made available for alternate use in successive time slots are concatenated to generate one or more substantially continuously available broadcast resources. For example, a first broadcast resource might be "freed-up" as a result of the inventive mapping discussed above, from 1:00 p.m.-3:00 p.m. A second broadcast resource might be "freed-up" from 3:00 p.m.-5:00 p.m., etc. A remote map can be generated to map the programming which would otherwise be allocated to a particular broadcast resource, instead onto these "new" resources during these time periods, thus freeing that particular resource. By continuing to map all of the sequential programs normally allocated to that particular broadcast resource instead to the various freed-up resources in this manner, the particular broadcast resource can provide a continuously available resource to more conveniently support alternate program transmission or other data services. In other embodiments, the alternate programming or data service can itself be distributed among the several broadcast resources made available during individual time slots, and reconstructed by means of a suitable local map.

In aspects of the invention, the channel mapping described is dynamically updated. It may, for example, be synchronized to frequent (e.g. real-time) changes in the desired utilization of particular broadcast resources, to accommodate dynamically changing similarity or identity between certain input data streams. By way of example, the mapping may be modified as often as required, and when required, in order to generate at least n output data streams sufficiently identical in relevant content to n input data streams, by means (at least periodically) of fewer than n broadcast resources. By dynamically adjusting the necessary mapping as required to meet such changing circumstances (i.e. as redundant programs begin and end on one or more sets of input data streams, or as non-common content such as desired commercials or source identifications occur in programs involved in n:n-y remote mapping, or as load requirements on the transmission media vary), maximum utilization of available broadcast resources can be achieved.

To accomplish the flexibility of dynamic channel mapping, a channel map generator generates channel maps reflecting the assignment of broadcast resources during particular time periods or slots. The channel map generator may identify those time periods during which identical program material is or will be present in two or more input streams. The channel map generator may utilize, in certain embodiments, pre-arranged scheduling which is typically supplied by content providers to broadcasters, often days in advance. In other embodiments, a content comparitor may monitor two or more input data streams for sufficient correlation in content, automatically recognizing the occurrence of substantially identical input streams as they occur and making this information available to the channel map generator. For example, the input program streams may be monitored for ID sequences used by content providers to identify the subject programs. Occurrence of the same program IDs associated with two or more input programs or streams in a common time period (i.e. beginning at or near the same time) would signal occurrence of common content. In other embodiments, the program content itself could be compared. Where automatic correlation is utilized, a suitable delay period may be used such that the channel maps are not altered unless substantial identity between two or more input data streams is recognized for at least a selected time period, thereby indicating a substantial identity and not mere coincidence in content during a brief period.

In other embodiments, the broadcaster may have need for an available broadcast resource during particular time slots. The map generator may then be instructed to attempt to identify input data stream redundancies during the desired periods in order to free the needed broadcast resource(s), or may be instructed to eliminate less-desired programs if necessary and generate new maps to reflect these changes as needed in order to free the desired broadcast resources.

When the channel map generator has identified opportunities for beneficial n:n-y:m mapping, in any of the foregoing manners or otherwise, it will generate the necessary broadcast (remote) and receiver (local) maps required. The local map is then transmitted to the viewer r subscriber stations, typically by means of the broadcast medium itself. For example, the local channel maps may comprise part of a control data transmission on one or more dedicated broadcast resources. In a typical DBS system employing multiple transponders, the information may be included in an appropriate data transmission carried by each transponder so that it will be available to the IRD regardless of which transponder is tuned at any given time.

Transmission of the local map requires allocation of broadcast bandwidth, which can be counterproductive to the desired goal of maximizing bandwidth available for useful program transmission. This is particularly true in a fully dynamic system, which might require frequent transmission of new maps to accommodate changes in the program streams. For example, if the mapping scheme is accommodating numerous redundancies to free several broadcast resources, including some program streams which have relatively frequent requirements for remapping to a 1:1 correspondence (e.g. during desired commercials or source identifications), the transmission of map data could be a significant burden on the system. In other important aspects of the present invention, these difficulties are avoided by providing improved transmission and updating schemes for local maps. For example, in preferred embodiments the receiving apparatus which receives and stores the local map is adapted to receive updates to less than the complete map. In this manner, only the changed information, together with necessary overhead, is required for transmission when a map update is desired. In the case of a high capacity DBS system, this may result in significant bandwidth saving since the majority of programs, and therefore broadcast resources, will not be involved in dynamic re-mapping during most time slots. Therefore the majority of the local map may be relatively static (as in the prior art) while other portions can be dynamically updated in accordance with the present invention. Although the complete local map may preferably be transmitted occasionally (to permit activation of new equipment and provide a periodic integrity check to correct any errors), such full map transmissions are reduced.

To further minimize transmission requirements for map changes, a plurality of complete maps may be transmitted and stored locally. For example, a first complete map can be transmitted and stored, followed by a second complete map stored in other memory. The receiving apparatus includes a map selector (e.g. selection vector, multiplexor, etc.) which selects the stored map that is to be active at a given time. To accomplish a change in local mapping, it is then necessary only to cause the receiver to select the desired alternate map. More than one available map may be locally stored, and transitions between these maps may be made repeatedly. For example, one map might allocate viewer channels to the broadcast resources during normal program periods, while another map returns to 1:1 correspondence during commercials (e.g. where it is contractually required that the promotional content of an input data stream be made identically available to viewers). Although a given program might have many commercials, each requiring two map changes, only two map transmissions would be required, followed by suitable signals to initiate the necessary local map selections. These selection signals will typically require much less transmission bandwidth than a complete or partial map, resulting in significant bitstream savings.

To minimize memory requirements (e.g. in a DBS IRD), the map may be divided into individual regions or segments, such as a main map and a plurality of sub-maps. The main map (which may be considered as a specialized sub-map) can contain mapping information which is common to all of a plurality of selectable maps, while other sub-maps may include those portions of the mapping which are unique to individual selectable maps. Transition from one map to another would require selection only of the appropriate sub-map, while the main map would continue to be effective. In this manner, additional transmission resources are saved since the common portion of the several local maps need only be transmitted once, and map updates, selection and transitions are facilitated.

A standard IRD today typically includes only a single tuner. In such devices, only one LNB frequency (i.e. corresponding to a single transponder) can be selected and processed at a given time. Accordingly, only one set of entries in the local map corresponding to the broadcast resources supported by that transponder are relevant to operation of the IRD at any given time. The remaining entries are relevant only if the user selects a different viewer channel corresponding to a different transponder. Where the active local map (which may be one of a plurality of selectable maps in certain embodiments) is functionally divided into regions (e.g. a plurality of sub-maps), only one of the regions need be active at a given time. The active region will depend on the present viewer channel selected by the user. If the user selects another viewer channel supported by the same map region (e.g. another program carried by the same transponder), that region will remain active. If the user, however, selects a different viewer channel which is supported by a different region, then the latter region of the local map will become active. In other embodiments, the processing circuits and functions which maintain and update the local map(s) may recognize the active region in the local map, allowing updates to any other region or cell. In other embodiments, updates may be made to any cell of any map, including the presently active map, so long as map read cycles are preferably prohibited during any update cycles of at least the presently active cell or region.

The foregoing aspects of the present invention greatly reduce time delays and overhead requirements when making local map changes. Reducing at least some transmissions to only those portions of a map which must be updated, or eliminating at least some repetitive or redundant map information transmissions, not only reduces the amount of bandwidth required for transmitting the overhead information, but also reduces the time required for making the necessary data transmission. For example, the time required to send a complete channel map in a high capacity DBS system, utilizing generally allocated transmission resources and speeds, could be two to three seconds or longer. Typically a complete map must be received accurately before the new map can be implemented, thereby restricting how quickly the system can adapt to changing requirements. Further, certain receiving equipment may impose its own hardware or processing restrictions in activating newly delivered local maps. In other aspects of the present invention, these shortcomings are minimized or eliminated. For example, by sending only update portions of a local map (e.g. individual sub-maps), the transmission times required are significantly reduced. Further, by transmitting a plurality of alternate and/or sub-maps once, and storing them locally for later selection, subsequent transmission delays (e.g. when commercials occur during a program) are completely avoided.

To dynamically synchronize changes in the utilization of broadcast resources, the map system may include a synchronization mechanism to coordinate activation of maps. The synchronization mechanism may include a timestamp instructing map selectors when and/or how particular map information (whether complete or partial) is to become effective. By way of example, the timestamp may indicate immediate activation, or an absolute time (e.g. GMT) upon which the map is to become active. In aspects of the present invention, the timestamp may also comprise an offset or delay time after which it is to become active (e.g. two seconds after receipt, or ten frames after a trigger event, etc.); a trigger event which will cause the map to become effective (e.g. receipt of a command over a command data stream or as part of the program data stream); activation in response to action by a local user (e.g. manual selection of a local map by means of a control panel or remote control device); or other suitable means. Where an absolute timestamp is used, all apparatus can be synchronized to switch effective maps at the same instant. This will be particularly useful where changes in the input data streams are known in advance (e.g. program changes are scheduled in advance to occur at certain known times). The use of a trigger event permits greater flexibility to accommodate unscheduled changes (e.g. early or late game starts, game completions, or time-outs during a sporting event during which commercials must be 1:1 mapped to viewer channels, etc.). Where a plurality of selectable local maps are stored in local memory, they may be switched nearly instantaneously by the local apparatus on receipt of the appropriate time or trigger, resulting in a tightly synchronized and highly flexible dynamic mapping system.

Both the foregoing general description and the following detailed description of presently preferred embodiments are exemplary and explanatory only, and are intended to provide further explanation of the invention as claimed. The invention will be further understood by reference to the following description of preferred embodiments, taken in conjunction with the accompanying drawings. It is to be understood, however, that the description of preferred embodiments is not intended to be limiting, and the present invention and claims are not intended to be limited to the embodiments as described.

BRIEF DESCRIPTION OF THE DRAWINGS

FIGS. 6A-D illustrate specific embodiments supporting dynamic channel mapping, including 1:1 mapping during certain periods of a given program.

FIG. 8 diagramatically illustrates an embodiment including a plurality of selectable local maps.

FIG. 9 diagramatically illustrates an embodiment including local maps comprising individual selectable sub-maps.

DETAILED DESCRIPTION OF THE PREFERRED EMBODIMENTS

Figure 1:
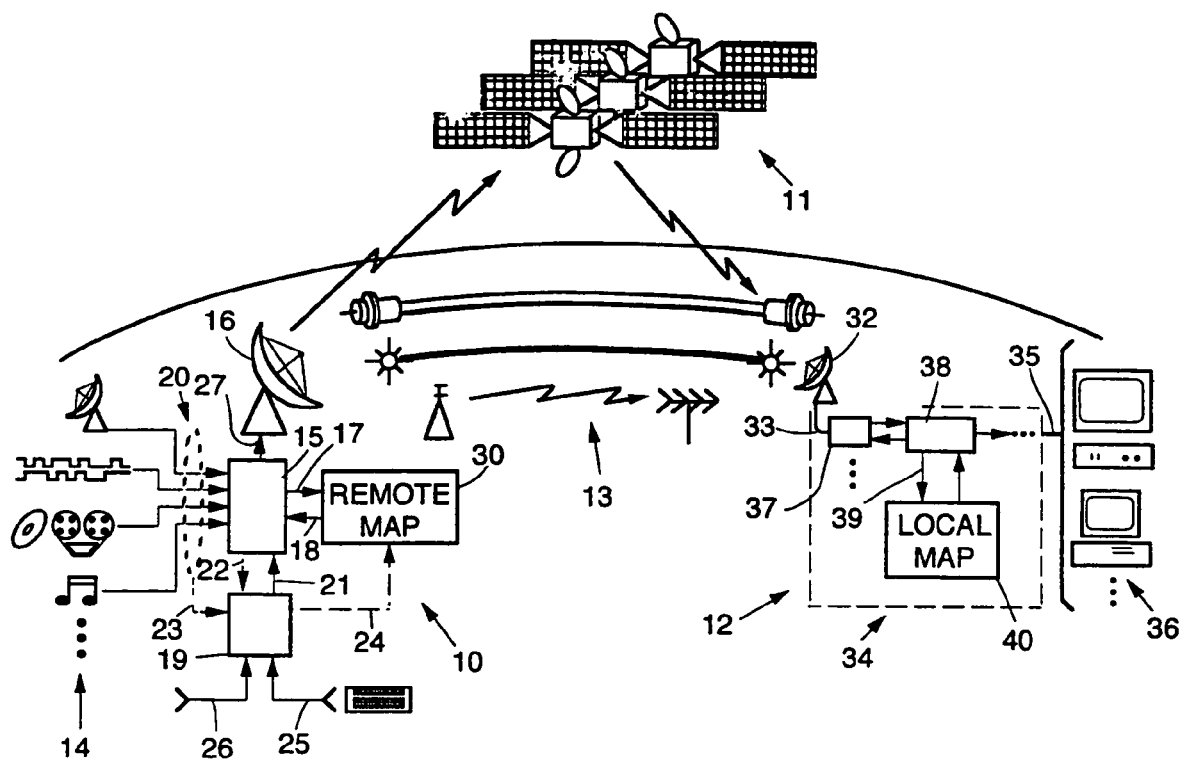
FIG. 1 is a diagrammatic depiction of a communication system incorporating the present invention, including transmission processing, broadcast, and reception processing elements.

FIG. 1 illustrates a representative communication system embodying elements of the present invention. In particular, a direct broadcast satellite (DBS) system is illustrated, including ground-based processing and uplink facilities 10, a space relay segment comprising one or more satellites 11 (preferably in geosynchronous orbit), and one or more (preferably a multiplicity) of ground-based receiving stations 12. It should be understood, however, that alternative transmission and broadcasting methods, utilizing other space or ground-based media 13 such as cable, optical fiber, or various wireless systems, could benefit from implementation of the present invention.

The ground-based processing and uplink facility 10 may include main processing equipment 15 for receiving program inputs and generating appropriate output signals 27 for transmission to the satellites 11 by means of an uplink antenna 16. In a high capacity DBS system, a large number of individual program streams (e.g. 175 channels worth or more) may be acquired from a number of vendors or content providers. These input data streams 20 may be provided to the processing equipment 15 by any known means 14, including satellite reception; digital or analog streams supplied by terrestrial optical, cable wire-based, wireless or other systems; prerecorded programming delivered on various media including magnetic tape and optical disc; locally generated data or programming; or otherwise. For the purposes of this invention it should be understood that the input data streams may comprise video information, audio information, data services of various types (e.g. multimedia, database services, software delivery, e-mail, etc.), or other information which is desired for transmission to one or more users (e.g. subscribers). A given input program may comprise one or more input data streams (e.g. one or more video, alternative audio, and associated data streams). When these individual input data streams relate to a single program, they may be delivered via a common medium (e.g. a single prerecorded tape) or may be delivered separately.

A high capacity DBS system will typically employ a number of discrete broadcast resources, each of which may be considered as a uniquely addressable conduit for conveying a desired bitstream. For example, a number of individual transponders might be supported on one or more satellites, each transponder utilizing an assigned unique frequency band and phase. In addition and as discussed below, modern DBS systems utilize digital transmission technology to provide greater capacity and improved performance. In such a system, each transponder signal may be further multiplexed in the time domain (e.g. TDM encoding) to provide a number of individually addressable "channels" of packatized information. In such a system, the available bandwidth is divided in both the frequency, phase and time domains, resulting in a large number of individual broadcast resources supported by the relay satellite 11 transponders. Other known or future multiplexing schemes may be employed in satellite or other distribution systems (e.g. cable or wireless systems) without departing from the scope of the present invention, so long as a plurality of individually selectable broadcast resources are supported.

An allocation of input data streams 20 to individual broadcast resources must be made by the processor 15. In particular, an allocation table or "map" 30 is maintained, which identifies the broadcast resource which is to be utilized at a given time for transmission of a particular input data stream. In preferred embodiments the map comprises addressable memory associated with the processor 15, and functions in conjunction with a controllable matrix switch or interconnection network which is part of processing equipment 15. Map 30 governs the correspondence between input data streams and uplink broadcast resources, and will be referred to herein as a transmission or "remote" map. Map output or read signals 18 are supplied to the processor 15 as required in order to control the interconnection network.

In order to provide the dynamic mapping capabilities which form part of the present invention, apparatus and methods are employed for flexibly and controllably updating map 30. Update signals 17 may be supplied to modify all or part of the contents of map 30, as will be discussed in greater detail below. Map generator 19 may generate update signals 21 for delivery to the processor 15, or may optionally provide direct update signals 24 to map 30. The map generator 19 determines when changes to both the remote (transmission) and local (receiver) maps are appropriate, and generates data necessary for updating the maps. The map update data may include not only revisions in broadcast resource allocations, but also a synchronization mechanism, governing when and/or how the revised information should become effective. Such map update and control information may be provided 21 to the processor 15 for inclusion in the output signal 27 for relay via satellites 11 to the receiving station(s) 12.

In order for the map generator to perform certain of the functions described herein, it requires input information identifying occasions when two or more input data streams contain, or will contain, sufficiently identical program or content material. This information may be provided from outside sources, such as advance schedules supplied by content providers. The schedule information may be received digitally (e.g. via modem or storage media) or otherwise, and input 26 to the map generator 19. Optional operator input(s) 25 (e.g. a keyboard) may also be provided. In other embodiments discussed below, the map generator 19 may compare some or all of the input data streams 23 to identify occurrences of sufficient similarity or identity, or it may receive similar information 22 from the processor 15. In these embodiments, the map generator 19 can respond automatically or in real-time to the occurrence of duplication in two or more input data streams.

The receiving station 12, in a DBS embodiment, includes a receiving dish 32 which typically comprises a signal collector (e.g. offset parabolic) and one or more low noise blocks (LNBs) which receive the satellite transponder signals. The received signal 33 is then supplied to an integrated receiver/decoder (IRD) which includes the necessary signal processing, control, and security apparatus. Among other functions, the IRD circuits 34 permit the user to select one or more desired output data stream(s) (e.g. a selected program), and tune to the appropriate broadcast resource(s) corresponding to the desired data stream(s). The selected data streams are then decoded and/or otherwise processed to generate outputs 35 for delivery to one or more user devices 36, such as a television display, audio receiver, computer, etc.

The processing circuits 34 of the IRD may include an electronically controllable tuner 37 for selecting a desired one or group of broadcast resources. For example, the tuner 37 may provide frequency and polarization selection, to select one of a group of frequency and phase division broadcast resources. In a typical IRDs, phase selection is accomplished at the LNB, and frequency selection is accomplished by a frequency-agile discriminator. Tuner 37 may be understood to comprise all such elements or functions required for selection of a single incoming signal. Tuner 37 may also be considered to include elements or functions for identifying, in a selected incoming signal, those individual packets in a TDM data stream corresponding to one or more selected output data streams. Other tuners and methods of tuning appropriate to alternative broadcast media and encoding schemes may, of course, alternatively be utilized. The signal(s) may then be provided to further processor(s) 38 for generating the desired output signal(s) 35. Processor(s) 38 may include, for example and without limitation, buffering, decrypting, and decompression functions, and appropriate output drivers.

In order to make the correct selection of the particular broadcast resource or resources corresponding to the desired output (e.g. viewer channel), a "local" map is utilized. Similar to the remote map, the local map provides a correspondence between incoming broadcast resources and selectable output data streams. Thus, if a viewer wishes to watch a particular program which is advertised as available on a given viewer channel generated by the IRD, the local map will contain the necessary correlation between that viewer channel output and the one or more broadcast resources which will be carrying the desired program information at the desired time. The local map 40 may communicate with the processors 38, both to supply the appropriate local map information required for setting tuner 37 to correspond to a user channel selection, and also to receive update signals 39 to the local map 40, as will be discussed in greater detail below.

Figure 2:
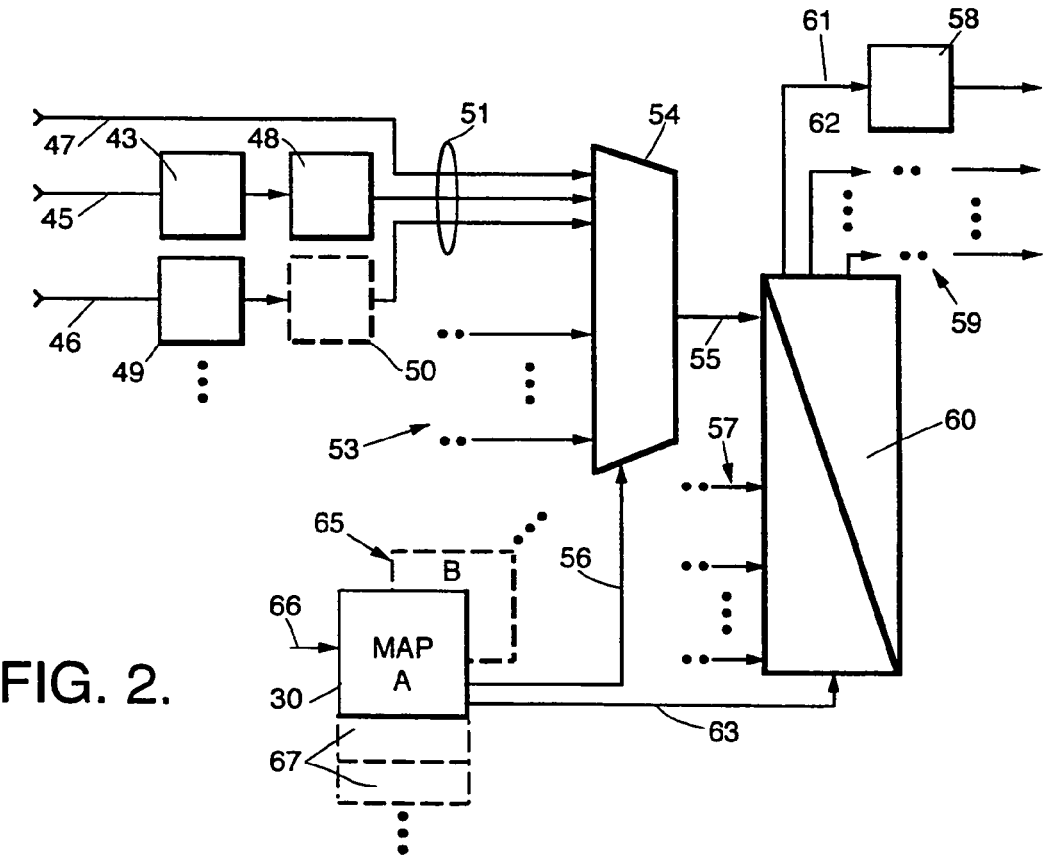
FIG. 2 is a conceptual block diagram of an uplink signal processing system (USPS) useable in the system of FIG. 1.

FIG. 2 diagramatically illustrates functions performed by an uplink facility 10, including an uplink signal processing system (USPS). A particular program input stream may include video information 45, one or more audio channels 46, and data 47. Data 47 may comprise program-related user data, general user data of various types, and/or control data (which may be generated by other portions of the uplink processing system). The video signals 45 may be subjected to video compression 43 (e.g. MPEG-2), thereby substantially reducing the bandwidth required for transmission of acceptable quality video. The compressed video may then be subjected to encryption 48 for security encoding to prevent unauthorized reception or use of the broadcast signal. The audio input(s) 46 may similarly be encoded 49 (e.g. MPEG or AC3) and optionally encrypted 50. The thus-processed video, audio and data signals may be considered as a set 51 corresponding to a given program. Similar processing may be performed on a large number of additional video, audio and/or information inputs, including other sets and/or individual data inputs. It should be understood that different input data streams may be processed differently. For example, the video encoder 43 and encryptor 48 may not be required for an audio-only channel. Further, control data 47 may not be required with each program data stream, or a program data stream may comprise entirely computer data intended for reception and use by a user's computer equipment (e.g. multimedia programming, software distribution, etc.). Control data may be encoded, encrypted and/or compressed.

The data streams, together with a number of other data streams 53, are processed and multiplexed by TDM multiplexor 54 to generate a multiplex data stream 55. This multiplex data stream may, for example, comprise the output intended for transmission over a selected frequency, for rebroadcast by a particular transponder on a particular satellite. Multiplexor 54 may preferably perform a time division multiplexing of the various data streams 51, 53 according to an appropriate protocol utilized by the DBS or other broadcast system. In a well-known example, the individual data streams are divided into individual packets, each with an identifying header or ID. The ID corresponds to an individual "channel" in the resulting TDM data stream 55, and individual segments of the programs will be reassembled at the receiving end by means of this header or ID information. Because the individual time slots in the TDM data stream 55 correspond to unique data channels, they correspond to individual broadcast resources in the final broadcast signal. Accordingly, it is necessary for the uplink facility equipment to assign individual input data streams to appropriate TDM time slots, according to the desired remote mapping. For this reason, multiplexor 54 is supplied with map information 56 from the remote map 30.

In a typical high capacity DBS system, the satellites 11 will support a plurality of frequency channels, by means of individual transponders operating at different frequencies and/or phases. In such a system, a plurality of multiplex data streams 55, 57 may be supplied to individual transmission circuits 58, 59. This may be accomplished by an electronically controllable interconnection network 60, which receives a plurality of input signals 55, 57 and connects them selectively to a corresponding plurality of outputs 61, 62 corresponding to individual transmission circuits 58, 59. The interconnection network 60 must also be provided with transmission map information 63, in order to accurately perform the frequency domain portion of the complete mapping of input data streams to individual broadcast resources. Although network 60 and multiplexor 54 are shown as separate elements, it should be understood that their circuits and/or functions can be combined, and many equivalent configurations will be known to those skilled in the art.

FIG. 2 further illustrates optional embodiments, which are discussed more fully herein in connection with the local map but have corollaries to the remote or transmission map 30. In particular, additional selectable maps 65 may be maintained, with appropriate means for selecting a presently-active map among plurality of available maps. Each map may be updated 66, in whole or in part, to accommodate changes in the mapping scheme. Further, one or more of the individual maps 30, 65 may comprise a plurality of sub-maps 67, including in some embodiments a main map. In these embodiments, the main map corresponds to mapping information which is common to a number of individual mapping schemes, while the sub-maps 67 contain mapping information which may change when different mapping schemes are selected as part of a dynamic mapping operation as described more fully below.

Figure 3:
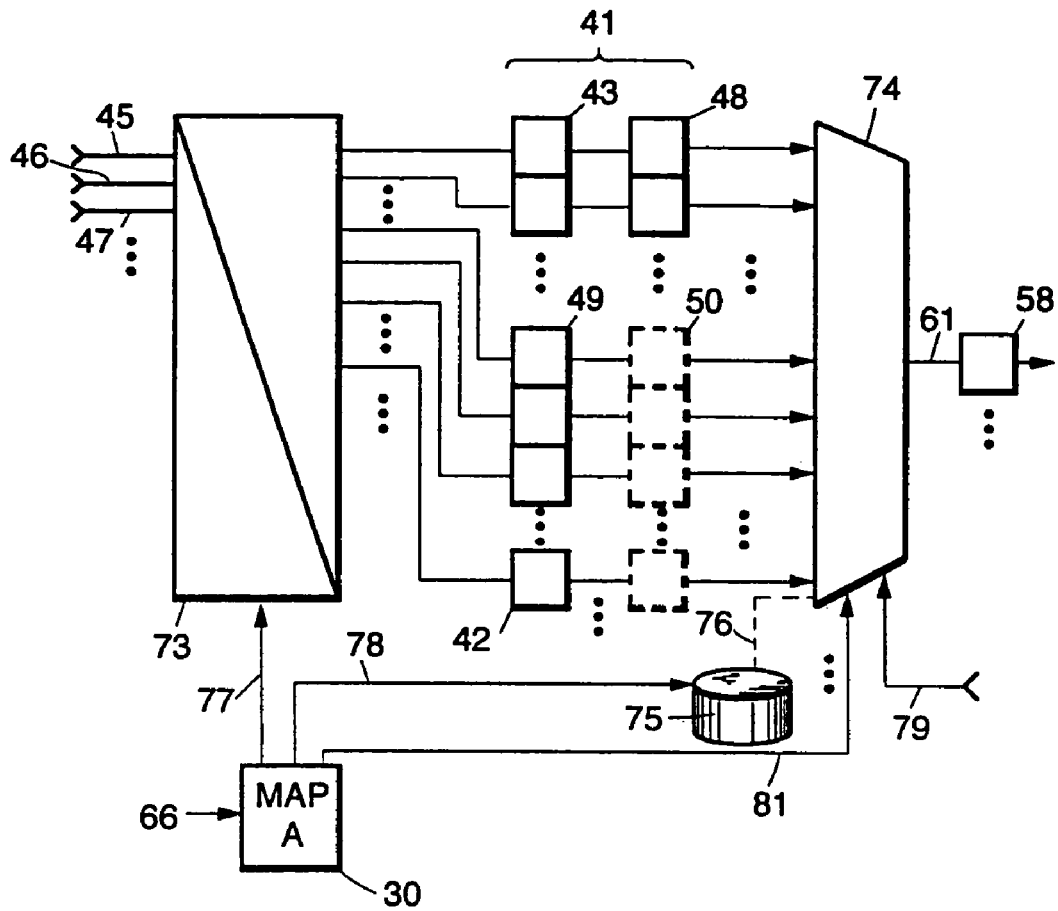
FIG. 3 is a block diagram of a preferred USPS useable in the system of FIG. 1.

FIG. 3 illustrates a preferred embodiment of an uplink facility. The various program input streams 45-47 etc. are supplied to an interconnection network 73. Network 73 selectively routes each input to an appropriate one of a plurality of signal processors 41. FIG. 3 illustrates a group of signal processors 41 which may be associated with the processing of a particular uplink frequency corresponding to one transponder. The processors 41 may include one or more (e.g. 4-8) means for video compression 43, one or more (e.g. 5-15) means for audio compression 49, and one or more data interfaces 42 (which may optionally compress or otherwise process input data). Each compressed video stream is then preferably encrypted 48. The compressed audio streams may optionally be encrypted 50, as may the data if desired.

The thus-processed data streams intended for transmission over a given transponder channel are then supplied to a TDM multiplexor 74. Multiplexor 74 is preferably provided with additional information inputs 79 relating to the anticipated data rates which must be multiplexed. The multiplexor 74 then processes the various inputs in known matters (e.g. statistical multiplexing) and outputs a multiplex data stream 61 for transmission over a particular transponder channel.

In this embodiment, routing of the various input data streams to selected signal processors 41 by interconnection network 73 determines the allocation or mapping of the inputs to an individual transponder channel. Network 73 therefore receives an input 77 from the presently-active remote map 30. Map information 81 may also be provided to the multiplexor 74 to permit proper labeling of each TDM channel packet, thereby providing a complete mapping of input data streams to individual broadcast resources.

Control and/or data services data 47 is illustrated as one or more inputs to the interconnection network 73, processed by one or more data interface units 42 and other optional processors. Alternatively, or in addition, data 76 may be provided directly to the multiplexor 74. In the embodiment illustrated, a data server 75 provides the necessary data 76 to the multiplexor 74 at the appropriate times. The data server may take any known form including ATM, data networks, etc. Map information 78 may be provided to the data server 75 to maintain appropriate correspondence between the data (as an input data stream) and an appropriate broadcast resource. For example, the data server or associated processor may construct appropriate packet addresses corresponding to selected broadcast resources for data delivered over a server network. It should be understood that alternative configurations are also possible and will be recognized by those skilled in the art, so long as data corresponding to an individual input data stream is properly identified and allocated according to the information in map 30 to the appropriate broadcast resource(s).

Figure 4:
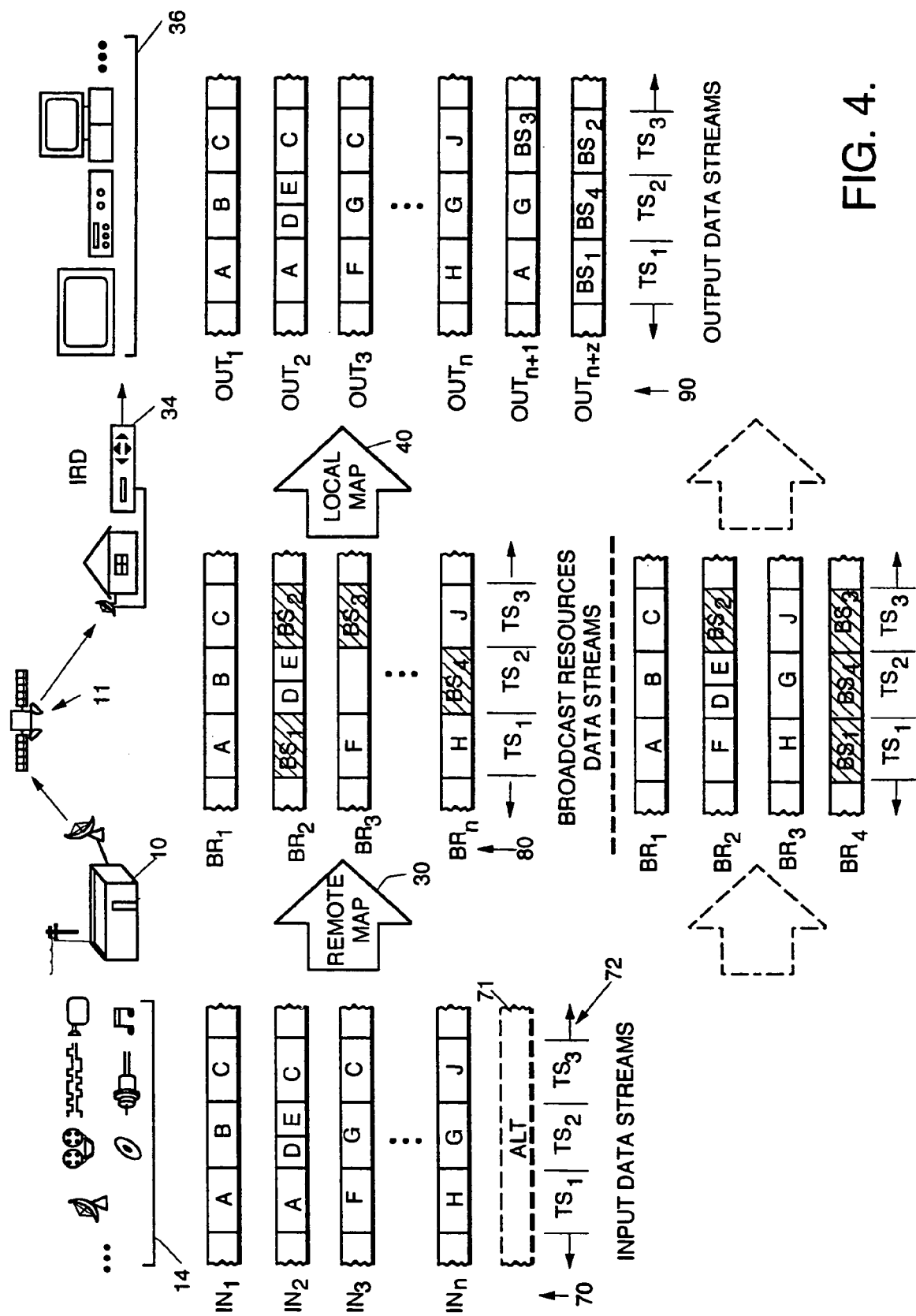
FIG. 4 diagramatically illustrates representative operation of embodiments of the present invention, including remote mapping of input data streams to broadcast resources, and local mapping of broadcast resources to output data streams.

FIG. 4 diagramatically illustrates operation of preferred mapping schemes in accordance with aspects of the present invention. Individual input data streams 70 ($IN_1, IN_2, \ldots IN_n$) are shown. In total, there are n individual input data streams available for transmission to subscribers. Also depicted is a representative one or more alternate data streams 71 which could desirably be transmitted if suitable broadcast resources were available. It should be understood, of course, that these depictions are generalized and are not intended as limiting. For example, alternate date 71 may comprise one or more continuous streams as shown (e.g. an additional video program), or may comprise data which does not require real-or near-real time delivery (e.g. e-mail, ATM, etc.). Further, the n input data streams represent those involved in the inventive mapping disclosed herein; the communications system may support other inputs as well, so long as at least a subset of n inputs practice aspects of the invention described herein.

The input data streams are shown over a representative time period which, for benefit of the following discussions, has been conceptually divided into individual time slots 72 or periods, $TS_1$-$TS_3$. It should be understood that the input data streams may be substantially continuous over an extended period of time, and may in part correspond to a sequence of individual programs.

For clarity, the following discussions will generally consider only one component (e.g. video) of a given program, and will address the input data stream, broadcast resource, and output data stream corresponding to that component of the original program. It should be understood that, as previously discussed, a program may in fact comprise more than one component, and the following discussions would be applicable to each such related component as well.

For example, input data stream $IN_1$ is illustrated as part of program A during a first time slot $TS_1$, program B during $TS_2$, and program C during $TS_3$. By way of a specific example, the input IN, might correspond to a regional sports network which acquires and broadcasts, for use by consumers and/or rebroadcasters, sporting events in a given region or of a particular type. Program A might therefore correspond to a major market basketball event, while Program C might correspond to a playoff game of greater general interest.

As previously noted, content providers typically purchase at least portions of their program content from other providers for rebroadcast. As shown in FIG. 3, for example, input data stream $IN_2$ might correspond to such a rebroadcaster who has arranged to purchase programs A and C from the service provider corresponding to $IN_1$. Accordingly, input data streams $IN_1$ and $IN_2$ will be identical or substantially identical during time slots $TS_1$ and $TS_3$, but not during $TS_2$. Similarly, input data stream $IN_3$ differs from $IN_1$ and $IN_2$ during timeslots $TS_1$ and $TS_2$, but carries the same program C during $TS_3$. Finally, input data stream $IN_n$ differs from all others during $TS_1$ and $TS_3$, but corresponds to $IN_3$ during $TS_2$.

This portion of FIG. 4 therefore illustrates several representative possibilities that can occur when similar program content exists in two or more input data streams 70, such as common programs or video feeds. Of course, it should be understood that other permutations are likewise possible and would come within the scope of the present invention as claimed.

As previously discussed, these individual input data streams $IN_1$-$IN_n$ must be mapped to available broadcast resources $BR_1$-$BR_n$. This is accomplished by means of the transmission or remote map 30 at the uplink facility 10.

A broadcast resource can take many different forms depending on the program delivery system. For example, in a satellite delivery system the broadcast resource may be defined by a particular satellite location among several; by a particular satellite in a cluster at that effective location; by frequency domain multiplexing relating to that particular satellite, such as a particular transponder uplink/downlink frequency pair; phase multiplexing on one or more frequencies (e.g. left/right circular polarization, or horizontal/vertical linear polarization), or by time multiplexing (e.g. TDM) within a particular frequency/phase; and otherwise. If multiple transmission media are used, a selection between individual media (e.g. DBS, other wireless service, cable, etc.) may be added. In all events, the local map must contain, or permit access to or generation of, sufficient information to permit accurate mapping of a user selected viewer channel (i.e. one or more output data streams) to the appropriate source/location/frequency/phase/timeslot/etc. as required.

In prior art systems, in order to convey n individual input data streams to a user or subscriber, in identical or substantially identical form and content, it was necessary to provide n individual broadcast resources. In other words, a 1:1 or n:n correspondence was required between input data streams and broadcast resources. In such a system, the bitstream $BS_1$ shown in $TS_1$ of $BR_2$ would consist of program A data, corresponding to the program material during $TS_1$ for input data stream $IN_2$. $BS_2$ and $BS_3$ would correspond to program C, and $BS_4$ would correspond to program G. In such prior known systems, the broadcast resource data streams would therefore be identical to the input data streams.

In accordance with the present invention, dynamic mapping may free certain broadcast resources during certain time slots, providing additional bandwidth which can then be used for transmission of alternate bitstreams such as programming 71. Referring to FIG. 4, it is seen that input data streams $IN_1$ and $IN_2$ are similar or identical during $TS_1$. Accordingly, the remote map 30 is modified at the beginning of $TS_1$ to map an alternative bitstream, $BS_1$, onto broadcast resource $BR_2$ during $TS_1$. At the end of $TS_1$, the remote map is modified again to map $IN_2$ to $BR_2$, since the programming on $IN_2$ during this time slot is unique and must therefore be carried over some broadcast resource to be available to the user or subscriber. However, during $TS_3$ up to two of the three broadcast resources which would, in prior art systems, be carrying program C data, can instead be mapped to alternate bitstreams $BS_2$, $BS_3$. Finally, as illustrated $BR_n$ is available to carry an alternate bitstream $BS_4$ during $TS_2$.

To summarize, according to one aspect of the present invention, duplications in utilization of broadcast resources are avoided by scheduling carriage of a single copy of the duplicative input data streams on a single broadcast resource, freeing the remaining broadcast resources from carrying unneeded redundant information and therefore making them available for carriage of additional beneficial bitstreams. Although this is a preferred embodiment, it should be understood that common program data can be carried, if desired, on more than one broadcast resource, although fewer than n.

It is desirable, of course, to make all of the input data streams available to a user or subscriber as output data streams which are substantially identical in relevant content to the input data streams. Thus, a viewer who wishes to watch a program scheduled to be carried by a particular network should have that program available to them when they tune to that network, even if that program is duplicative of similar programs being simultaneously carried on other networks. Stated differently, it should not be the burden of the viewer to find the desired program, but instead they should be able to tune to a network and receive an output which is substantially identical in relevant content to the output which would be available to them in a simple n:n prior art remote mapping.

In order to accomplish this, the local map 40 is modified in conjunction with the remote map 30, in a generally complimentary fashion. Referring again to FIG. 4, a user may desire to watch or otherwise utilize output data stream $OUT_2$ during one or more of time slots $TS_1$-$TS_3$. For example, a program guide (electronic or printed) might indicate that a particular sporting event is being broadcast on a particular sports network at a particular time of day. The viewer will then tune to the viewer channel which is known to correspond to that network, and expect to see that game. To accomplish this, the local map 40 is updated at the beginning of $TS_1$ to map $OUT_2$ to $BR_1$, not to $BR_2$ (as in prior art systems). During time slot $TS_1$ the viewer will therefore receive an output data stream corresponding to the desired program A, even though the broadcast resource (or resources) normally associated with that viewer channel was not carrying program A but instead a different bitstream, $BS_1$. Similarly, the local map 40 will map a viewer selection for either $OUT_2$ or $OUT_3$ during $TS_3$ to $BR_1$, resulting in program C data being available on each of $OUT_1$, $OUT_2$, and $OUT_3$ during $TS_3$. Finally, $OUT_n$ is mapped during $TS_2$ to $BR_3$, making program G data available to users who select $OUT_n$ during $TS_2$.

At the end of each time slot, the maps may revert to a normal n:n scheme, or to an alternate mapping scheme according to the present invention (as shown) which accommodates the circumstances of programming during the next time slot.

In summary, the present invention allows for transmission to users of a number of individual input data (e.g. program) streams, and makes those data streams available to the user in identical or sufficiently identical form, by means of fewer broadcast resources than the number of input data streams involved. This is accomplished in part by dynamically mapping the broadcast resources, at both the transmission and reception locations, such that the broadcast resource maps are modified with respect to individual broadcast resources at the beginning of each of a series of time slots. When input data streams contain sufficiently identical content material, redundancy in utilization of broadcast resources is avoided by dynamically mapping the common input data streams to a lesser number of broadcast resources (e.g. one) at the transmission end, and dynamically mapping the viewer channels intended to correspond with that content material to an appropriate one of the lesser number of broadcast resource(s) at the reception end. Output data streams are thereby generated at the receiving end which are substantially identical to the input data streams, including those not actually transmitted. Importantly, broadcast resources not used for redundant transmission may instead be utilized for beneficial carriage of other bitstreams.

In particular embodiments of the present invention, the local map 40 may also generate derivative channels by mapping additional output data streams (e.g. $OUT_{n+1}$) to various broadcast resources during different time slots. In the example illustrated, $OUT_{n+1}$ is mapped to $BR_1$ during $TS_1$, to $BR_3$ during $TS_2$, and to $BR_3$ during $TS_3$. Of interest, although $OUT_{n+1}$ is mapped to $BR_3$ during $TS_3$, the output data stream does not correspond to the program present in input data stream $IN_3$ or to the output data stream $OUT_3$. Instead, a portion of the bitstream or bandwidth which was made available for alternate use by means of dynamic mapping has been employed to carry new program data, $BS_3$, which would not have been available to a user in the prior art systems.

In specific embodiments, the local map may also be used to generate "hybrid" derivative outputs. For example, the video component of a first program and the audio component of a different program, may be mapped to a single viewer channel. The ability to selectively intermingle program segments and individual data streams in this manner provides even greater flexibility to the broadcaster, and to the user.

Finally, local map 40 may map the newly-available bitstreams in individual time slots preferentially to a particular viewer channel, to create a substantially continuous additional viewer channel for carrying unique (as opposed to merely derivative) programming. For example, FIG. 4 illustrates a local mapping of the bitstream $BS_1$ carried by $BR_2$ during $TS_1$ to the output data stream $OUT_{n+z}$ during $TS_1$. In similar fashion, $BS_4$ on $BR_n$ is mapped to $OUT_{n+z}$ during $TS_2$, and $BS_2$ on $BR_2$ is mapped to $OUT_{n+z}$ during $TS_3$.

Accordingly, dynamic mapping permits a new utilization of broadcast resources in a broadcast system, according to the formula n:n-y:m, where $n \geq 2$; $n \geq y \geq 1$; and $m \geq n$ (generally m>n). In other words, n individual input data streams can be transmitted over less than n broadcast resources, while still making at least n output data streams available to a user which are sufficiently identical in relevant content to the n input data streams available to a user. Up to y broadcast resources are thus made available for carrying alternate bitstreams, permitting more programs, data, and/or higher quality transmission of existing programs. Additionally, new output data streams may be optionally provided, including not only derivative but also unique new outputs and/or hybrid derivatives, where the unique new output data streams are carried by means of the y broadcast resources.

Referring again to FIG. 4, a particularly preferred embodiment is shown at the bottom of the figure. In this embodiment, the remote map 30 reorganizes the allocation of input data streams to broadcast resources more flexibly, in order to concatenate the bitstreams which are freed up over sequential time slots and assign them to a particular selected broadcast resource. In this manner, a broadcast resource can be made continuously available for alternate signal carriage, without frequent map shifts relating to that broadcast resource.

Figure 5:
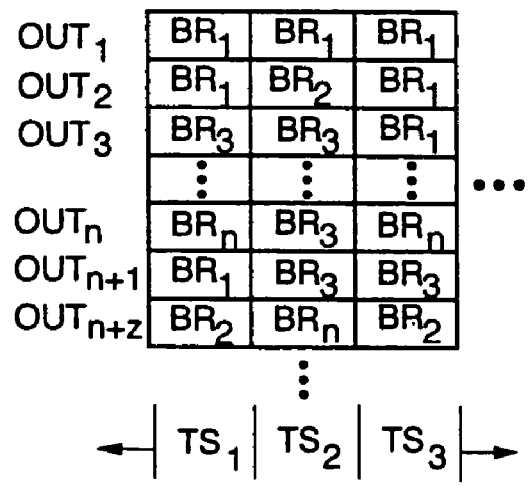
FIG. 5 is a local channel map corresponding to the example of FIG. 4.

FIG. 5 depicts a representative local map during the time slots $TS_1$-$TS_3$, which corresponds to the particular example shown in FIG. 4. In each entry, the data pertaining to a broadcast resource identifies all factors required to segregate that resource, as previously discussed. The map may be retained in memory as a matrix or otherwise, in manners that are well known. The remote map may have a similar format.

It should be understood that the map retained locally and/or remotely may cover just the present time, or may include a number of time slots. Thus a map may comprise a matrix as shown, or a simple correspondence column. Although a map will typically comprise a look-up table, other systems may be used without departing from the present invention. For example, if a number of broadcast resources are related to output data streams in a prescribed manner, a description of the correspondence (e.g. mathematical algorithm or relational description) may be provided which is suitable to permit a mapping processor to reconstruct the appropriate correspondence. Further, although the remote and local maps are related and may be considered to be complimentary, it is not necessary for the two maps to be identical in their coverage. For example, the remote map might comprise a matrix extending over a number of time slots, while the local map might be restricted to one or a few time slots of information in order to reduce memory requirements in an IRD or other receiving device.

As previously mentioned, it is necessary to transmit the local map information to receiving stations in order to support the dynamic mapping changes required by the present invention. Transmission of map data in prior art systems has not posed a significant problem because of the limited requirements in static mapping systems supporting only infrequent map updates.

The local map information is preferably distributed to users by means of the same communication system utilized for transmitting the substantive program or data information. By way of example, in a DBS system it is preferred to distribute local map data as part of the information relayed via the satellite elements. However, it should be understood that local map information may, if desired, be received via other means (e.g. cable or telephone connection). Where the local map information is included in the satellite signal, it may be encoded on a dedicated data channel to which each receiver is permanently or periodically tuned, or it may preferably be inserted periodically into each of the program data streams carried over each individual transponder. In the latter case, the map information is available to the appropriate processors in the receiving device (e.g. IRD) regardless of which frequency is presently tuned, and only a single tuner is required. Duplication of the map data transmissions in this manner, although preferable, exacerbates the problem of overhead data requirements, particularly in a highly-dynamic mapping scheme.

FIG. 6 diagramatically illustrate further aspects or extensions of the dynamic channel mapping of the present invention. Dynamic channel mapping may be useful at times corresponding to typical program changes (e.g. 15 minutes, 30 minutes, 60 minutes). In many instances, dynamic channel updates every 15 or 30 minutes will support a beneficial system operation. For example, content providers who sell programming to other content providers will often not require strict identity between the output data streams received by a user from the rebroadcaster, and the original data streams provided. The rebroadcaster may be free, for example, to insert their own commercial or promotional material. Often a content provider who purchases programs from other providers will receive the programs with commercial or promotional material identifying the original provider, yet transmit the program without modification. Accordingly, in many instances it is acceptable for a broadcaster (e.g. a DBS or cable operator) to provide users with a slightly modified output data stream that, although not identical to the corresponding input data stream, is nevertheless substantially identical in relevant content.

In particular, and referring to FIG. 4, a viewer who tunes to $OUT_3$ during $TS_3$ to watch program C may, without their knowledge, be mapped to the same broadcast resource, $BR_1$, that corresponds to $IN_1$. This viewer may therefore receive commercials and identity information, or other minor program variants, which were part of input data stream $IN_1$, and not the possibly differing commercials, identity information or other variants which were inserted by the content provider of $IN_3$ and therefore were part of the slightly differing data stream corresponding to program C present in $IN_3$. These minor differences between the output data stream and the input data stream can be tolerated in many cases, and the output data streams are sufficiently similar to the input data streams despite the beneficial n:n-y remote mapping.

In other cases, it may be necessary or desirable to provide a more complete identity between output data streams and individual input data streams, while still taking advantage, where possible, of the benefits of the inventive mapping schemes disclosed herein. Referring to FIGS. 6, an example is diagramatically illustrated corresponding to a single program (A) in a single time slot ($TS_1$). As shown in FIG. 6A, a typical program might include individual program segments ($A_1$, $A_2$, . . . ) interspersed with other content such as commercials or identity information (C1, C2, . . . ). As shown, the program segments $A_1$-$A_5$ in a first input data stream $IN_1$ may be identical or substantially identical to the corresponding program segments $A_1$-$A_5$ in a second input data stream $IN_2$. However, the commercials in the two input data streams may differ. Thus the first commercial in program A on $IN_1$ might be commercial C2, while the corresponding commercial appearing at the same time during program A on $IN_2$ is C12.

The present invention may be extended to accommodate these differences and make output data streams available to the user which are more identical to the input data streams, including commercials or other unique content. In particular, as shown in FIG. 6B a first broadcast resource $BR_1$ may be allocated to carry the first input data stream $IN_1$, and a second broadcast resource $BR_2$ allocated to carry the unique content of input data stream $IN_2$. During the program segments $A_1$-$A_5$ which are identical or nearly identical, channel mapping as previously discussed may be used to map the output data stream(s) or view channel corresponding to the program input data stream $IN_2$, onto the broadcast resource $BR_1$ carrying input data stream $IN_1$. However, when a commercial or other unique content occurs, the channel maps are dynamically modified to map the output data stream(s) or viewer channel associated with $IN_2$ instead onto broadcast resource $BR_2$, in order to display the unique commercial C12 to a first viewer tuned to a viewer channel corresponding to $IN_2$, while a second viewer tuned to the viewer channel corresponding to $IN_1$ will view the unique commercial C2. On completion of the commercial, the mapping may dynamically revert to its previous state. In this manner, bitstreams $BS_1$-$BS_5$ on $BR_2$ are made available to carry other useful program or data information. The inventive concepts previously discussed are therefore scaleable, and can be applied within a given time slot (e.g. $TS_1$) corresponding to a typical program length, or in smaller time increments (e.g. a, b, . . . ). Indeed, as shown in FIGS. 6C and 6D, it is possible to further refine the time scaling of dynamic mapping to accommodate common material within a particular commercial stream. For example, if advanced schedules or a real-time analyzer determine that one of a series of commercials (e.g. $C13_a$) is common to two or more input data streams, one or more of the redundant broadcast resource data streams (e.g. $BR_2$) can be mapped to another, freeing an additional bitstream (BS) which can be beneficially used for carrying other data or program information.

Figure 7:
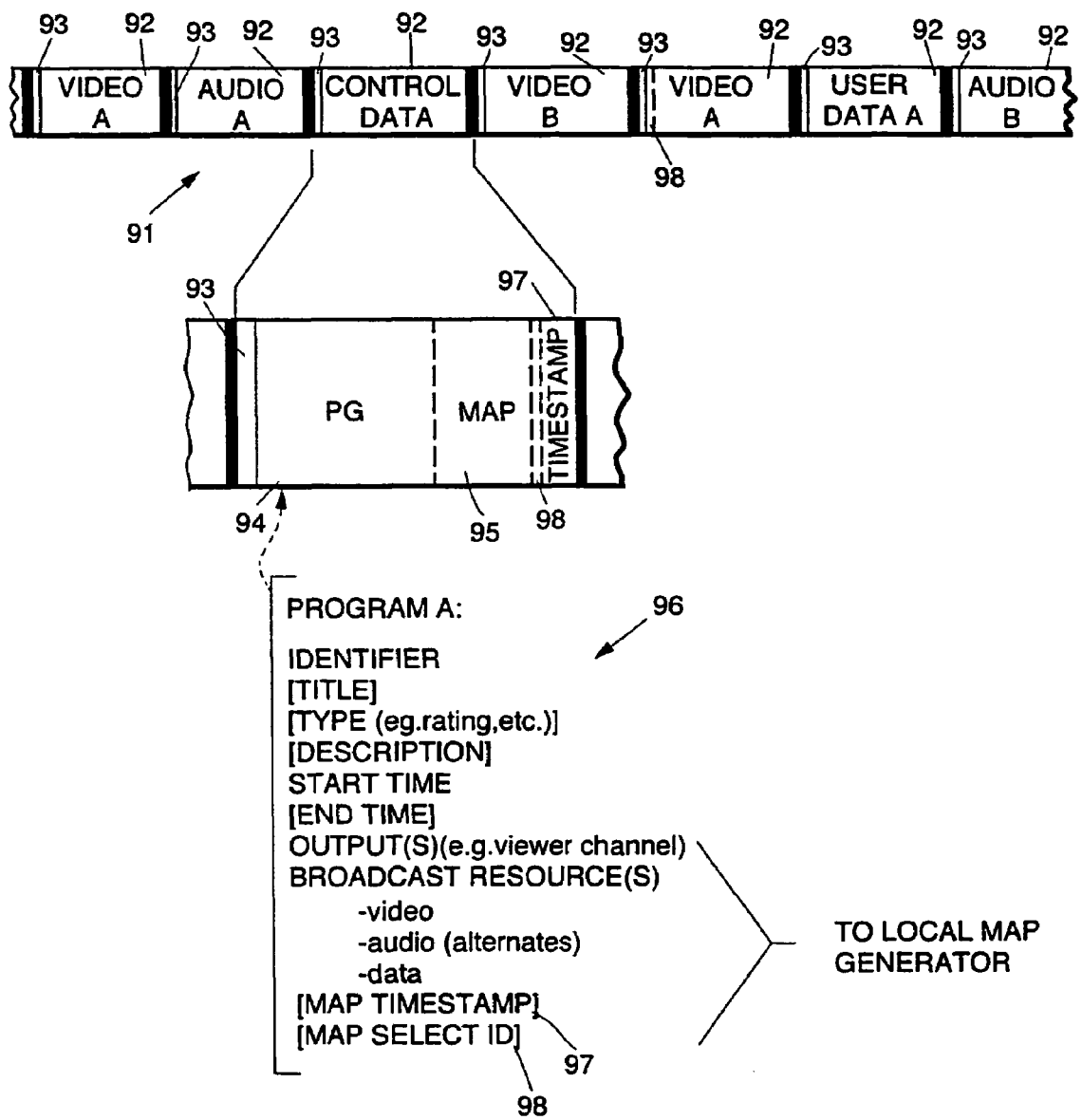
FIG. 7 diagramatically illustrates a data stream for transmitting local map information to receiving stations.

FIG. 7 shows one method for inserting local map information into the program stream for transmission over each broadcast resource in a DBS system. Each TDM broadcast resource data stream 91 includes individual packets 92 of program (e.g. video, audio or data) information with appropriate identifying headers 93 as previously discussed. In preferred systems, each packet may comprise 130 bytes, including a 3 byte header and 127 byte payload. The control packets preferably periodically include information 94 concerning upcoming program content of the various service providers, such as program guide (PG) information. This information can be used by processors in the IRD to locally generate a channel guide for display on a television receiver, informing the viewer of the programs that will be available on various viewer channels. This program guide information is typically updated every 2-4 seconds (at least with respect to basic information), and is multiplexed into each broadcast frequency at the uplink processing center. Regardless of which broadcast frequency an individual IRD is presently tuned to, it will therefore receive periodic updates of the program guide information.

In one preferred embodiment of the present invention, the local map update information is included with the program guide information. For example, the local map information may be separately structured and broadcast in conjunction with the program guide information but as an appended data stream 95. Map data 95 may comprise part of a data packet (e.g. shared with PG data 94 as illustrated), or preferably may be transmitted in dedicated map data packets. In another embodiment 96, the necessary broadcast resource and output data stream or viewer channel information for each time slot can be included within the program guide information, and the necessary map information then stripped from the incoming program guide data stream by processors within the IRD for assembly of a local map. Where multiple maps and/or submaps are maintained according to certain aspects of the present invention, a map select identifier 98 may be appended to the map data in any of these or other map data transmission schemes.

According to another aspect of the present invention, it is preferable that the map information include timestamps (e.g. 97) as part of a synchronization mechanism for making the revised map information effective at prescribed times, or on occurrence of prescribed triggers, as discussed in greater detail below. This permits greater flexibility in the dynamic channel mapping function, without changing the periodic transmission schedule for the program guide information.

Additional aspects of the present invention provide for highly flexible, controllable transition between individual mapping schemes to accommodate dynamic mapping transitions, while simultaneously reducing or minimizing the amount of broadcast bandwidth that must be allocated for the control and implementation of the dynamic mapping scheme. FIG. 8 diagramatically represents one preferred scheme for local mapping. A plurality of individual maps 100-102 are maintained, such as in appropriate memory provided in an IRD. Map update means or functions 103 are provided to create and/or update individual maps. The map update means 103 receive update information 106 from appropriate control circuits 105 of an IRD including map data and corresponding map select IDs identifying which of the plurality of map(s) the received data relate to. In preferred embodiments, this information is received through tuner 37 and receiving dish 32 as part of the received data stream of each broadcast resource, although other delivery media and schemes are possible as previously noted. Memory update means or functions 103 may take any suitable form, and may be integral with the control circuits 105. One or more of the maps 100-102 may be created or updated in its entirety, or the map update information 106 may correspond to only partial modification of one or more of the maps 100-102.

Each of the plurality of maps 100-102 may correspond to a different mapping scheme. Map reading and selecting circuits or functions 104 determine which map is presently active to govern operation of the associated receiver (e.g. IRD). Map reading and selecting 104 may take any known hardware or software form, such as a multiplexor for selecting one of a plurality of inputs, or preferably a vector or offset register for directing the memory read circuits to access different segments of map memory, etc. The map read and select function 104 may be integral to the circuits and functions provided by control circuits 105. In general, a select signal 107 will determine which map is presently active, based on instructions (e.g. timestamps) received as part of the dynamic map control data streams and/or other inputs (e.g. user selections).

The receiver control circuits 105 will typically receive a user request input 108, such as by means of an infrared or RF remote control 109 or other user input device (e.g. keypad or screen driven menu system). The control circuits will then access the appropriate active map to determine the correct broadcast resource(s) corresponding to the requested viewer channel. A broadcast resource select signal 111 may then be supplied to the tuner 37. Data signals 112 are supplied to the control circuits 105 to, among other things, maintain the maps current to updates and dynamic changes.

In the embodiment illustrated, a dynamic transition in channel mapping can be accomplished by simply sending or otherwise causing a new map select signal 107. The individual maps 100-102 can be received at an earlier time when convenient (e.g. when excess bandwidth is available, or in small increments spread over time). Because no map data then needs to be transmitted to the IRD in order to effect a later map select, substantially instantaneous transitions on command are possible.

Further, by storing a plurality of alternate selectable maps in advance, frequent transitions in support of e.g. individual commercial cut-ins can be supported without undue overhead data requirements. In particular, a first map 100 might correspond to the 1:1 correspondence mapping of two or more broadcast resources required when unique portions of input data streams must be individually carried over allocated broadcast resources for identical presentation as unique output data streams. A second map 101 might correspond to the alternate mapping permitted during those times when sufficiently identical program material is present in two or more of the input data streams, permitting mapping to a lesser number of broadcast resources as previously described. During normal program segments when the input data streams are sufficiently identical, map 101 may therefore be effective, freeing a portion of the broadcast bitstream for alternate use. When commercials or identity information that must be identically provided to a user occur, the system can dynamically map to the first map 100. On completion of the unique program content, the system can dynamically revert to map 101. Other maps may accommodate other permutations suggested by various input data streams during a relevant time period. Once the individual maps are transmitted, transitions can be accomplished by merely sending appropriate select and timestamp information, in a highly efficient manner.

It should be understood that the complimentary remote mapping function (e.g. at the uplink center) may similarly utilize a plurality of individual selectable maps, timestamps, etc., and its operation is synchronized to that of the local maps. In certain uses, remote map transitions will precede (in absolute time) the local map transitions, to compensate for transmission delays in the delivery system (e.g. geosynchronous satellite up- and downlink delays).

Each of the maps 100-102 may provide a complete correspondence for all output data streams and all broadcast resources. However, in a preferred embodiment diagramatically illustrated in FIG. 9, an alternate structure is used to reduce memory requirements. In general, the correspondence between the majority of output data streams and broadcast resources will be relatively static over extended periods of time, in manners similar to the prior art systems. Frequent updates of these portions of the remote and/or local maps are not required. In contrast, those portions of the map which correspond to broadcast resources involved in dynamic mapping may require frequent selection and/or update during given time periods.

In a preferred embodiment, therefore, the map may comprise a plurality of individual regions or sub-maps. For example, map 120 comprises a first portion or sub-map 121 which contains correspondence information which remains relatively static over a relevant time period. The first portion 121 might correspond to the portions of maps 100-102 in FIG. 8 which are common to each of the maps. The preferred embodiment 120 further comprises unique sub-maps 122-125. The sub-maps generally contain correspondence information relating to more dynamically changing broadcast resource allocations. By way of example, a first sub-map 122 might contain the appropriate correspondence information affecting a given viewer channel during periods when that channel is mapped to a first broadcast resource or set of resources, while a second sub-map 123 might contain the alternate correspondence information required to map that viewer channel to a different broadcast resource or set of resources under other circumstances (e.g. during commercials). It should be understood that sub-maps could contain a matrix of correspondence information relating to a number of broadcast resources including one or more viewer channels, or sub-maps could be provided relating to individual broadcast resources.

The map reading and selection means (e.g. 104 in FIG. 8) function to select the appropriate sub-map which is active at any given time. It should be understood that a similar scheme may be used for both the remote map and local map. The preferred embodiment of FIG. 9 is not exclusive of the embodiment of FIG. 8, and it should be understood that each map of FIG. 8 could itself comprise a plurality of sub-maps to facilitate flexibility.

Selection of an active map or map region (e.g. sub-map or relevant cell within a larger map region) may depend on the output data stream(s) (e.g. the viewer channel) which is presently active. Typical receiving apparatus include a single tuner, and can select and process only one broadcast frequency at a time. Accordingly, where the active map (which may be one of a plurality of selectable maps) is divided into subregions (e.g. sub-maps), the receiving circuitry can select the appropriate sub-map corresponding to the desired output data stream(s), or to the active frequency. If a different viewer channel is later selected which is also supported by the same sub-map or region, no changes need to be made in the active map selection. However, if a viewer channel is selected which is not supported by the presently active sub-map or region, the correct alternate map, sub-map or region must then be selected. Where more than one tuner is supported by a single map, the processing circuits associated with the additional tuner (or tuners) must be provided with suitable access to the map, sub-map or region relevant to the respective output data stream(s), or to the active frequency, selected for that tuner.

Although the majority of examples discussed above involve processing of a single viewer channel (which may comprise multiple output data streams related to a common program), it should be understood that the present invention is not limited to these embodiments. Multiple unrelated data streams, including multiple viewer channels, may be simultaneously processed by a given receiver if desired, limited only by the capabilities of the receiving apparatus. For example, a plurality of independent data services may be simultaneously processed in parallel. If all such data streams are multiplexed onto a single transmission frequency, then only one frequency tuner is required. In order to benefit from the present invention, each processing channel (e.g. frequency and/or time tuner) must be provided with access to the dynamically controlled local map.

Figure 10:
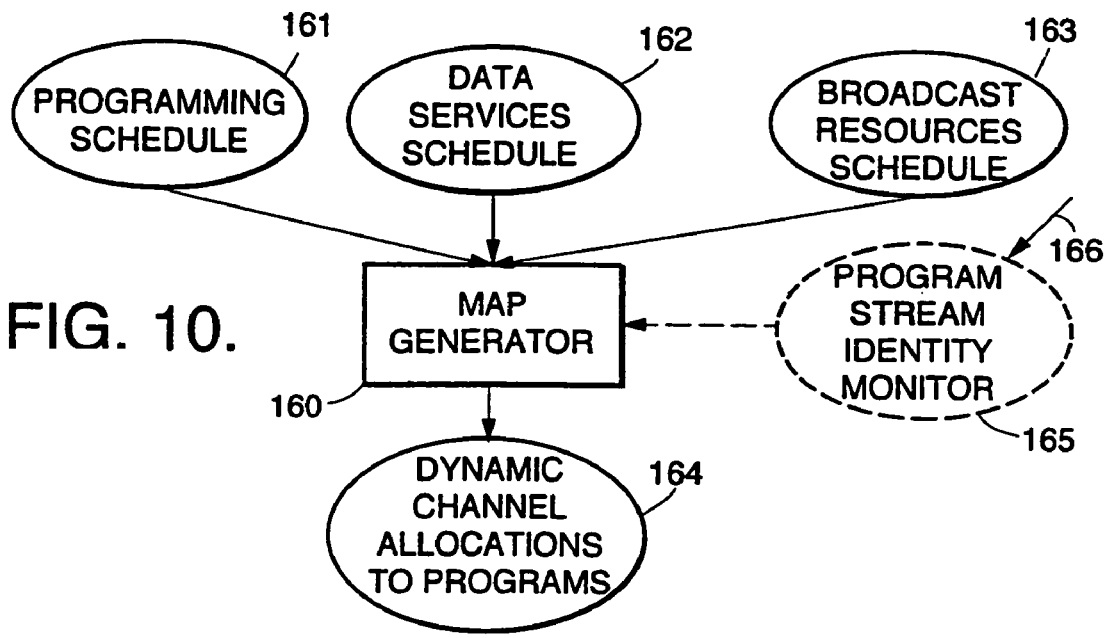
FIG. 10 is a simplified logic diagram of one embodiment of a map generator useful at an uplink facility.

FIG. 10 shows a simplified logic diagram of the operation of one embodiment of a map generator. The map generator 160 receives program scheduling information and assigns the usage of broadcast resources in order to combine common programming onto a lesser number of broadcast resources. When common programming is to be shown on more than one viewer channel, a single broadcast resource is preferably assigned to carry the common program data, although a greater number may be allocated if desired so long as at least one broadcast resource is freed from carrying the redundant program data.

To accomplish the desired n:n-y remote mapping, the map generator 160 may compare the pre-arranged program schedules 161 and/or data services schedules 162 with the schedule of available broadcast resources 163. The map generator 160 identifies periods of time when the same program content are scheduled to occur in two or more input data streams. In relation to those time periods when such simultaneous programming is to occur, a broadcast resources schedule is checked for broadcast resources which are scheduled to be available to carry programming during that time period. Similar to broadcast services and program streams, broadcast resources may vary over time, for example, as new equipment is installed or becomes available, or as equipment is taken in and out of service for maintenance. In a preferred embodiment, identical programming is assigned to a common broadcast resource. In a more preferred embodiment, identical programming is assigned to a common broadcast resource only if the number of broadcast services (including redundant services) exceeds the number of available broadcast resources. Using the various schedules, the map generator 160 creates channel maps 164.

In an optional embodiment, the map generator 160 may alternatively or additionally receive input from a program stream identity monitor 165. The identity monitor 165 monitors two or more data streams 166 in real or near-real time to detect occurrence of identical or sufficiently identical content in two or more input data streams. For example, the identity monitor 165 may compare program identifiers (i.e. unique labels) used by the content providers and typically included in the input data stream(s) corresponding to each program. When the identity monitor 165 detects the same program identifier in two or more input data streams, appearing at or sufficiently near the same point in time (e.g. indicating that the program is not only identical, but also that it began at approximately the same time so that content in one input data stream will be substantially identical to the relevant content of another data stream, although possibly offset slightly in time), it may signal detection of adequate identity in the subject input streams. For example, the monitor 165 may monitor the identifiers in two or more input data streams, noting transitions which indicate the commencement of a new program. When such a transition is detected in a first input data stream, the monitor 165 may then watch for a similar transition in the identifiers in another input data stream, occurring within a selected window of acceptable time offset. If such an occurrence is noted, the monitor 165 may inform the map generator 160. In particular embodiments, the identity monitor 165 may wait to signal the map generator 160 until the detected correspondence between two or more data streams continues for a selected time period, in order to prevent mapping transitions when the detected identity is merely transient. Further, the identity monitor 165 may continue to monitor input data streams which have been determined to be sufficiently identical, in order to advise the map generator 160 when the identity ends (e.g. at the end of a program, or if one of the content providers switches to alternative programming).

In other embodiments, the identity monitor 165 may alternatively, or in addition to ID label comparison, monitor the data streams themselves for a selected degree of similarity. The monitored data streams may comprise raw input data streams from content providers, or preferably subsequent related data streams such as pre-processed or compressed data streams generated from the input streams. It can be expected that data streams arriving from differing sources over differing media, even if relating to the same program, might differ somewhat. For example, a signal received from a rebroadcaster might arrive at a slightly later time, due to additional processing and transmission delays introduced by the rebroadcast. The program stream identity monitor may preferably accommodate these non-substantial differences. The program stream identity monitor 165 may preferably monitor a subset only of the total data streams processed and broadcast by a given system. For example, where it is known that a group of rebroadcasters might typically carry purchased signals from another vendor, whether scheduled or unscheduled, those particular data streams can be monitored for coincidence. Similarly, news networks could be monitored for scheduled or unscheduled common program information, such as presidential addresses and the like.

Although the program stream identity monitor 165 could be used to continuously compare certain input data streams, in other embodiments it may be allocated to particular input data streams during particular periods of time. For example, an identity monitor may be assigned to compare two specified input data streams during all or a portion (e.g. the end portion) of a given program, such as a sporting event. The identity monitor can then accommodate unscheduled occurrences, such as the end of a game, causing the system to dynamically re-map to a 1:1 correspondence at the end of a game when a rebroadcaster switches to unique alternative programming. The resulting program stream identity information may be used by the channel map generator 160 in lieu of, or in preferred embodiments, in addition to processing of prearranged schedule information 161, 162.

Figure 11:
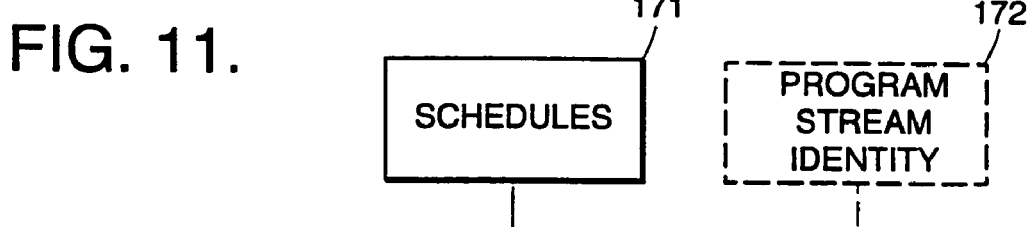
FIG. 11 is a simplified flow chart illustrating operation of one embodiment of the map generator of FIG. 10.

FIG. 11 depicts operation of a preferred embodiment of the map generator 160. The map generator compares 180 the number of broadcast resources required by the program schedules 171, to the broadcast resources available. Optionally, program stream identity information 172 may also be considered, in addition to or in lieu of schedule information. If the number of broadcast resources necessary does not exceed 181 the number of available broadcast resources, then dynamic mapping is not actually required. Each broadcast resource therefore may carry the broadcast service for a single input data stream. When the required broadcast services (i.e. input data streams) exceed 182 the number of available broadcast resources, the map generator 160 identifies 183 the time periods when identical or substantially identical input program content occur. The map generator 160 may compile and maintain 104 channel maps assigning broadcast resources, including both remote and local maps.

The updated channel maps are preferably dynamically synchronized to changes in the utilization of broadcast resources as changes occur. The map generator 160 preferably updates the channel maps to identify simultaneous common programming which can share broadcast resources or to reflect changes in the programming schedule as they occur. Changes in program scheduling, for example, may occur as programs are moved to different broadcast resources, programs are added, as programs end earlier or later than originally scheduled, or as variable time programs (e.g. sporting events) begin or end.

In another aspect of the present invention, transitions in the dynamic mapping scheme may be synchronized to time, program content, and/or other trigger events. In one preferred embodiment (see FIG. 7), each map (whether full or partial) includes a timestamp 97 which indicates when the map or map update is to become effective. The timestamp 97 may be used in several different modes. For example, the timestamp may comprise a simple flag indicating that the channel map should take effect immediately upon receipt, or may include a time at which the map is to become effective. The time can be given in the form of an absolute time (e.g. at 16:50:30:02 [4:50 p.m. plus 30 seconds, plus 02 frames] Jan. 1, 1997, GMT). IRD's are typically provided with updated and synchronizing clock signals for other purposes, and thus a tightly synchronized transition of receiving devices is possible in this embodiment.

According to aspects of the present invention, the timestamp 97 may comprise an offset or delay time. The new map or map update will then become effective a selected time or other offset measure after its receipt (e.g. in two minutes, thirty seconds, and/or a specified number of video frames).

Another group of timestamps may utilize triggers to initiate a map transition. For example, the timestamp might indicate that a revised map is to become effective upon receipt of a subsequent coded signal or trigger event in the broadcast stream. The trigger could be part of the overhead data transmissions which are sent on a separate channel or by a separate media, or preferably could be control signals sent as part of the data associated with each transponder signal in a DBS system. Embedding the trigger events directly in the program stream provides opportunity for highly flexible and synchronized control. For example, a trigger flag 98 could be appended to the beginning or end of a given packet of video or other program data, or otherwise coded into the program data stream. In yet another embodiment, both a trigger event and an offset are specified. In this embodiment, the new or revised map would become effective a given delay after occurrence of the trigger event. In a particular embodiment, both the trigger flag 98 and offset may be sent together, or an earlier data command may specify in advance the offset to be used when a simple trigger is later received.

Other forms of timestamp or control algorithm are also possible. By way of example only, the timestamp might indicate a time window during which map transitions are enabled, and/or time windows when transitions are disabled. A manual trigger could also be specified, so that map changes are tied to certain user inputs (e.g. selection inputs). The timestamp and control schemes are not mutually exclusive, and can be used in various combinations or hybrids. For example, the system may support instant, delay offset, absolute time, trigger event, and manual commands in a highly flexible and adaptable dynamic mapping scheme.

Map transitions, including synchronized local map transitions, permit a new and highly efficient utilization of broadcast resources under various conditions. Particular embodiments provide efficient utilization of the broadcast spectrum in a flexible dynamic mapping system, by reducing the amount of bandwidth required for transmitting map update and control information. Partial map updates, plural maps stored for selective use, and flexible timestamp control in various modes provide a maximum of control options while requiring a minimum of control information overhead. It should be understood that use of the inventive concepts are not exclusive, and they may be used in combination with other mapping and map information transmission schemes. For example, in order to accommodate new subscribers whose receiving equipment (e.g. IRD) may not have had past access to the incoming data streams, complete map(s) may be periodically transmitted, with intervening transmissions limited to selected updates, selection commands, etc., as previously discussed.

In yet another aspect of the present invention, the local map can function as an edit decision list. The broadcast resources make available to the local receiver (e.g. IRD) a multiplicity of program sources at various times. The local map may "pick and choose" from these resources to assemble a derivative output data stream unlike any input stream. In conjunction with the dynamic mapping capabilities previously described, a new and highly flexible system results. Changes in the edit decision list reflected in the local channel map can be made on a dynamic basis, triggered by various timestamp events, including manual user inputs. Unscheduled changes in the input data streams, and unique program content in the output, can be accommodated by the dynamic mapping capabilities, unlike prior known systems for developing simple derivative channels. In a particular embodiment, the output data stream can be directed to a recording device (e.g. memory or VCR), and the IRD may generate or forward (e.g. from a received data stream) commands for controlling the recording function. By introducing such a time shifting device, the edit decision list can operate to assemble a derivative output from input bit streams that are non-contiguous in time.

In preferred embodiments the dynamic mapping of the present invention is utilized to generate, at a receiver, output data streams which are substantially identical to corresponding input data streams. It should be understood, however, that other uses are possible as well. For example, the dynamic mapping methods and apparatus described can be used to free broadcast resources for carrying additional desired programming, at the expense of other non-redundant input data streams. If, for example, 25 input sources are present for potential transmission, but only 16 broadcast resources are available during a particular period of time, the program sources can be prioritized and maps generated to "drop" certain programs during certain time slots. In these circumstances, certain of the output data streams might not have substantial identity to the input data streams, although the network would benefit from the capabilities of the dynamic mapping schemes discussed herein.

It will be understood that various modifications, additions and deletions from the foregoing description are possible and would be understood by those having ordinary skill in the art. It is therefore intended that the foregoing detailed description of certain embodiments be regarded as illustrative rather than limiting, and that it be understood that it is the following claims, including all equivalents, which are intended to define the scope of the invention.

What is claimed is:

1. A method of carrying a plurality input data streams on at least one of a plurality of broadcast resources in a communication system, comprising:
   detecting a period of substantially common content in $n_1$ input data streams wherein $n_1 \geq 2$; and
   transmitting the substantially common content via $n_3$ broadcast resource(s) wherein $0 < n_3 < n_1$.

2. The method of claim 1, wherein the substantially common content is transmitted via $n_3$ broadcast resources during at least part of the period of substantially common content.

3. The method of claim 1, wherein the plurality of broadcast resources consists of $n_2$ broadcast resources, and wherein $n_2 > n_3$ and the method further comprises:
   during at least part of said period of substantially common content, transmitting at least a portion of a third input data stream via at least one of the $n_2$-$n_3$ broadcast resources.

4. The method of claim 3, wherein the third input data stream comprises information relating to a higher quality version of one of the $n_1$ input data streams.

5. The method of claim 3, wherein the third input data stream are allocated to at least one of the $n_2$-$n_3$ broadcast resources preferentially to a viewer channel.

6. An apparatus for carrying a plurality input data streams on at least one of a plurality of broadcast resources in a communication system, comprising:
   means for detecting a period of substantially common content in $n_1$ input data streams wherein $n_1 \geq 2$; and
   means for transmitting the substantially common content via $n_3$ broadcast resource(s) wherein $0 < n_3 < n_1$.

7. The apparatus of claim 6, wherein the substantially common content is transmitted via $n_3$ broadcast resources during at least part of the period of substantially common content.

8. The apparatus of claim 6, wherein the plurality of broadcast resources consists of $n_2$ broadcast resources, wherein $n_2 > n_3$ and wherein the means for transmitting the substantially common content via $n_3$ broadcast resource(s) wherein $n_3 < n_1$ comprises means for transmitting at least a portion of a third input data stream via at least one of $n_2$-$n_3$ broadcast resources during at least part of said period of substantially common content.

9. The apparatus of claim 8, wherein the third input data stream comprises information relating to a higher quality version of one of the $n_1$ input data streams.

10. The apparatus of claim 8, wherein the third input data stream are allocated to at least one of the $n_2$-$n_3$ broadcast resources preferentially to a viewer channel.

* * * * *